United States Patent

Okajima et al.

[11] Patent Number: 5,932,320
[45] Date of Patent: Aug. 3, 1999

[54] POLYESTER FILM FOR DECORATIVE PLATE OR DECORATIVE SHEET

[75] Inventors: Nariaki Okajima; Takatoshi Miki; Kenji Yoshihara, all of Shiga-ken, Japan

[73] Assignee: Mitsubishi Polyester Film Corporation, Tokyo, Japan

[21] Appl. No.: 08/957,445

[22] Filed: Oct. 24, 1997

[30] Foreign Application Priority Data

Oct. 29, 1996 [JP] Japan ................................. 8-303640
Dec. 17, 1996 [JP] Japan ................................. 8-337004

[51] Int. Cl.⁶ .................................................... B32B 3/00
[52] U.S. Cl. ........................ 428/195; 428/212; 428/218; 428/219; 428/480; 427/412.1; 427/412.3
[58] Field of Search .................... 428/40.1, 41.7, 428/41.8, 480, 483, 352, 354, 215, 206, 204

[56] References Cited

U.S. PATENT DOCUMENTS

| | | | |
|---|---|---|---|
| 3,607,374 | 9/1971 | Siebel | 117/138.8 F |
| 3,927,244 | 12/1975 | Ogura et al. | 428/483 |
| 4,066,820 | 1/1978 | Kelly et al. | 428/483 |
| 4,581,286 | 4/1986 | Ohe et al. | 428/42 |
| 5,114,789 | 5/1992 | Reafler | 428/328 |
| 5,132,148 | 7/1992 | Reafler | 427/393.5 |
| 5,215,811 | 6/1993 | Reafler et al. | 428/212 |
| 5,286,528 | 2/1994 | Reafler | 427/412.1 |
| 5,405,681 | 4/1995 | Nakayama et al. | 428/215 |
| 5,677,024 | 10/1997 | Abe et al. | 428/40.1 |
| 5,800,911 | 9/1998 | Sankey et al. | 428/213 |

FOREIGN PATENT DOCUMENTS

| | | |
|---|---|---|
| 0 249 109 | 12/1987 | European Pat. Off. . |
| 0 728 801 | 8/1996 | European Pat. Off. . |
| 0 783 962 | 7/1997 | European Pat. Off. . |

*Primary Examiner*—William Krynski
*Assistant Examiner*—Betelhem Shewareged
*Attorney, Agent, or Firm*—Foley & Lardner

[57] ABSTRACT

The present invention relates to a polyester film for decorative plate or decorative sheet, which comprises a base polyester film and a coating layer formed on at least one surface of said base film, and which has an optical density of 0.1 to 5.0 and longitudinal and transverse heat shrinkage percentages of not less than −10.0% and not more than +10.0% after said film is heat-treated at 180° C. for 5 minutes.

10 Claims, No Drawings

POLYESTER FILM FOR DECORATIVE PLATE OR DECORATIVE SHEET

BACKGROUND OF THE INVENTION

The present invention relates to a polyester film for a decorative plate or decorative sheet. More particularly, the present invention relates to a polyester film for a decorative plate laminated by clear film, which comprises a coated polyester film having specific properties, and shows an excellent suitability for decorative plate.

The decorative plate has a laminated structure in which at least a film layer and a picture-printed layer are in turn superimposed over a surface of substrate, and generally means a building material (surface material) capable of being dealt as an independent product. The decorative sheet means a decorative material (surface material) which is adhered to a surface of substrate for various products such as furniture, building components or housing appliances and provided on a surface thereof with a picture-printed layer. Accordingly, the film layer and the picture-printed layer laminated over the surface of substrate of the decorative plate, are components of the decorative sheet.

As a sheet material interposed between the substrate and the picture-printed layer of the decorative plate or a sheet material (film) used in the decorative sheet, vinyl chloride resin sheets are most generally used. However, in the case where the vinyl chloride resin sheet is used, there arise such problems that a plasticizer blended in the sheet material is transferred to an adhesive layer formed on its surface to be adhered, resulting in deteriorated adhesion thereof, or that the vinyl chloride resin sheet suffers from elongation or shrinkage by heating due to low thermal dimensional stability thereof, thereby causing wrinkles thereon. Further, in recent years, there has been an increasing demand for producing decorative plates or decorative sheets without using the vinyl chloride resin sheet, from a standpoint of environmental protection.

Meanwhile, as described above, since decorative plates and decorative sheets are used as a surface material, picture patterns having a high design value are generally formed on a surface thereof. Therefore, it is extremely important to adjust or control color tones of the decorative plates or decorative sheets in order to obtain appropriate contrasts between the picture patterns or delicate contrasts of shade and shadow thereon. Specifically, as the substrates of the decorative plates or the substrates to which decorative sheets are attached, various materials such as plywood, e.g., particle boards, steel boards or the like have been used. In general, these substrates have a variety of color tones which are different from each other, even if they are formed from the same material.

Accordingly, if individual films for the decorative sheet have a deteriorated hiding power, the color tone of the substrate adversely affects that of the surface of the decorative plate or decorative sheet, so that inherent high design value of the picture patterns formed thereon are damaged. For this reason, it is required that the sheet materials or films for the decorative plates or decorative sheets have a high hiding power, thereby enabling these sheet materials or films to be widely applicable to substrates having various color tones.

On the other hand, biaxially-oriented polyester films, typically polyethylene telephthalate films have been widely utilized in various fields because of their excellent properties. As disclosed in Japanese Patent Application Laid-Open (KOKAI) No. 7-17005, these biaxially-oriented polyester films have been proposed so as to be used only as surface materials for decorative plates. However, there has not yet been any proposal in which the biaxially-oriented polyester films are interposed between the substrate and the picture printed layer, in other words, that the biaxially-oriented polyester films are used as a sheet material or film for decorative sheets.

Meanwhile, polyester films are generally deteriorated in adhesion to various materials as compared with vinyl chloride resin films or sheets. Accordingly, in the case where the polyester films are used instead of the vinyl chloride resin films or sheets, there are caused disadvantages, e.g., deteriorated adhesion to wood as the substrate. The decorative plates are used to decorate surfaces of various furniture, doors or the like. Therefore, the occurrence of delamination or separation of the film from the substrate should be prevented because the delamination or separation shows that the decorative plates are imitation products.

As a material for a sash bar for receiving an aluminum sash, in many cases, there have been used decorative plates composed of a wooden material. In this case, the decorative plates used as the sash bar are exposed to severe change in temperature between summer and winter seasons together with load of the aluminum sash. Under such a circumstance, if the adhesion between the film and the substrate is deteriorated, the delamination or separation of the film from the substrate is likely to occur, thereby causing undesirable mountain range-like undulations along the sash bar. In addition, when it is intended to form picture patterns having a high design value on the film by printing or the like, there arise problems such as deteriorated suitability for printing, deteriorated wettability for ink or adhesive, occurrence of delamination or separation of the laminated printed layer due to low adhesion thereof.

Further, with respect to the decorative plates laminated by clear film, there arises the below-mentioned problems.

Decorative plates having such a laminated structure in which an adhesive layer, a film layer and a picture printed layer are in turn superimposed on a substrate are called "printed decorative plate". The decorative plates having such a laminated structure in which a first adhesive layer, an inner film layer, a picture printed layer, a second adhesive layer and an outer film layer are in turn superimposed on a substrate are called "decorative plate laminated by clear film". Incidentally, as the substrates, wood-based boards such as plywood or particle boards, inorganic boards, steel boards or the like can be appropriately used.

Especially, the decorative plate laminated by clear film has such technical advantages that (i) an appropriate protection for the picture-printed layer can be attained by the outer film layer, (ii) when the outer film layer comprises a transparent film, the decorative plate can exhibit a high-grade picture pattern, and (iii) when the outer film layer comprises an embossed film, the decorative plate with a three-dimensional moire finishing can be produced. For these reasons, the decorative plates laminated by clear film can be used in higher-grade applications as compared with the printed decorative plates.

Owing to the afore-mentioned advantages, the decorative plates laminated by clear film can be applied to front face decorations of various furniture, doors or the like. Especially, in the case of furniture, doors or the like comprising a wood-based board, the corners thereof are defined by adjacent two flat portions which are crossed at a right angle. These corners can be formed by bending the afore-mentioned decorative plate.

The bending of the decorative plate has been generally performed by a so-called V-cutting process. In the V-cutting process, V-shaped notches are formed on a surface of a substrate of the decorative plate such that the depth of each notch is slightly smaller than the thickness of the substrate. The decorative plate is then bent at these V-shaped notches such that the notched surface of the decorative plate is located inside. For this reason, the suitability for bending deformation process, of the decorative plate is highly relied upon those of the films used therein. Especially, in the case of the decorative plates laminated by clear film in which inner and outer films are used, it is required that these films show more excellent suitability for bending deformation process as compared with in the case of the printed decorative plate having only one film. If the films are deteriorated in suitability for bending deformation process, the bent shape of the decorative plate cannot be kept stable when subjected to V-cutting and bending processes, but readily returns back to its original flat shape. Further, at this time, there is a likelihood in which the decorative sheet comprising the inner film layer, the picture-printed layer, the adhesive layer and the outer film layer is separated from the substrate, so that the decorative plate is deteriorated in its appearance or design value. Therefore, it is required that the films used in the decorative plate laminated by clear film shows excellent suitability for V-cutting and bending processes.

Also, in the case where the decorative plate is used as surface materials for furniture, doors or the like, it is inevitably brought into contact with, for example, tip ends of a cleaner, nails or the like. If the films adhered to the substrate of the decorative plate have low self-healing properties (restoring properties), dents caused thereon by the afore-mentioned contact are left as they are, so that a high design value of the picture pattern of the picture-printed layer cannot be maintained. In addition, if the films adhered to the substrate of the decorative plate do not have an appropriate strength or rigidity, plastic deformation thereof becomes increased and it is impossible to remove such dents by self-healing. Especially, in the case of the decorative plate laminated by clear film, it is required that the films to be adhered to the substrate of the decorative plate are excellent in self-recovery for dent deformation (resistance to impact deformation) which is a property combining the afore-mentioned self-healing properties and strength or rigidity.

Hitherto, as films for the decorative plates, vinyl chloride resin films have been most generally used. The vinyl chloride resin films have also been applied to many decorative plates laminated by clear film. The vinyl chloride resin films are readily deformable, and therefore, show a good suitability for V-cut processing. However, since the vinyl chloride resin films are deteriorated in resistance to impact deformation due to lack of appropriate mechanical strength, there arises a problem in which the thickness of the film must be sufficiently increased, or the like.

In addition, since the vinyl chloride resin films cause environmental problems upon burning, there is a strong demand for developing films comprising other materials instead of the vinyl chloride resin films. Further, when the vinyl chloride resin film is adhered to a substrate through an adhesive layer, there arises such a problem that a plasticizer or a stabilizer contained in vinyl chloride resin is transferred to the adhesive layer, resulting in deteriorated adhesion thereof to the substrate. Furthermore, since the vinyl chloride resin films inherently show large elongation or shrinkage upon heating due to low thermal dimensional stability thereof, there also arises a problem in which the decorative plate laminated by the vinyl chloride resin film is likely to suffer from wrinkles on a surface thereof.

Incidentally, with respect to decorative plates using other films than the vinyl-chloride resin films, there have been proposed a decorative plate in which a laminated material comprising a polyolefin-based synthetic paper as base film or a flexible polyester film as a base film is used (Japanese Patent Application Laid-Open (KOKAI) No. 7-17005 (1995)); a decorative plate in which a laminated material comprising a thermoplastic transparent elastomer film selected from the group consisting of styrene-based films, olefin-based films, urethane-based films, fluororubber-based films, polyamide-based films and ester-based films, or an polyolefin-based resin is used (Japanese Patent Application Laid-Open (KOKAI) No. 6-79830 (1995)); or the like.

However, the afore-mentioned conventional decorative plates using the polyolefin-based resin films are not suitable for furniture or interior building materials, because these decorative plates show a large calorific value upon burning, e.g., upon fire. For this reason, there is a demand for decorative plates using other films than the polyolefin-based resin films.

Polyester films are advantageously used for the decorative plates because of relatively low calorific value and less environmental problem upon burning thereof. Further, the polyester films are excellent in thermal dimensional stability. However, the polyester films are usually deteriorated in the suitability for V-cut processing. In addition, in many cases, the polyester films are unsatisfactory in adhesion to plywood. Also, when it is intended to form a picture printed layer on the polyester film, the adhesion thereto is unsatisfactory, because the polyester films are deteriorated in adhesion to an adhesive layer or the picture printed layer. Accordingly, there are conventionally known no decorative plates laminated by clear film, which are excellent in suitability for V-cut processing, in resistance to impact deformation and in adhesion property, and which cause less environmental pollution upon burning.

As a result of the present inventors' earnest studies for solving the above problems, it has been found that by using a polyester film coated on at least one surface thereof with a coating layer and having a specific optical density, a specific coefficient of thermal shrinkage and a specific tensile modulus, as a film layer of a decorative plate in which at least the film layer and a picture printed layer are in turn laminated over a surface of a substrate, or as an inner film layer of a decorative plate laminated by clear film in which at least a first adhesive layer, the inner film layer, a picture printed layer, a second adhesive layer and an outer film layer are in turn laminated over a substrate, there can be obtained the decorative plate or the decorative plate laminated by clear film which is free from the afore-mentioned problems and can show excellent properties. The present invention has been attained on the basis of the above finding.

SUMMARY OF THE INVENTION

It is an object of the present invention to provide a polyester film for decorative plate or decorative sheet which is free from environmental problems upon burning, enables picture patterns having a high design value to be formed thereon without being adversely influenced by color tone of substrate, and shows an excellent thermal dimensional stability and an excellent adhesion to the substrate.

It is another object of the present invention to provide a polyester film for decorative plate laminated by clear film, which is considerably improved in suitability for V-cut processing and in resistance to impact deformation, and is free from environmental pollution upon burning.

To accomplish the aim, in a first aspect of the present invention, there is provided a polyester film for decorative plate or decorative sheet, which comprises a base polyester film and a coating layer formed on at least one surface of the said base film, and which-and an optical density of 0.1 to 5.0 and longitudinal and transverse heat shrinkage percentages of not less than −10.0% and not more than +10.0% after the said film is heat-treated at 180° C. for 5 minutes.

In a second aspect of the present invention, there is provided a decorative plate comprising a substrate and at least a polyester film layer comprising the polyester film as defined in the first aspect and a picture-printed layer, the said film layer and said picture-printed layer being in turn laminated on the said substrate.

In a third aspect of the present invention, there is provided a decorative sheet comprising a polyester film layer comprising the polyester film as defined in the first aspect and a picture-printed layer formed on at least one surface of the said film layer.

In a fourth aspect of the present invention, there is provided a polyester film for decorative plate laminated by clear film, which comprises a base polyester film and a coating layer formed on at least one surface of the said base film and which has longitudinal and transverse tensile moduli of not more than 600 kg/mm².

In a fifth aspect of the present invention, there is provided a decorative plate laminated by clear film, which comprises a substrate, at least a first adhesive layer, an inner film layer comprising the polyester film as defined in the fourth aspect, a picture-printed layer, a second adhesive layer and an outer film layer, and which layers are in turn laminated over the said substrate.

DETAILED DESCRIPTION OF THE INVENTION

The present invention is described in detail below. The wording of "polyesters" used herein means polymers having ester groups, which are produced by the polycondensation of dicarboxylic acid with diol or hydroxy-carboxylic acid.

Examples of the dicarboxylic acids include terephthalic acid, isophthalic acid, adipic acid, azelaic acid, sebacic acid, 2,6-naphthalene-dicarboxylic acid, 1,4-cyclohexane-dicarboxylic acid or the like. Examples of the diols include ethylene glycol, 1,4-butane-diol, diethylene glycol, triethylene glycol, neopentyl glycol, 1,4-cyclohexane-dimethanol, polyethylene glycol or the like. Examples of the hydroxy-carboxylic acids include p-hydroxy-benzoic acid, 6-hydroxy-2-naphthoic acid or the like.

Typical examples of the polyesters include polyethylene-terephthalate, polyethylene-2,6-naphthalate or the like. The polyesters used in the present invention may be in the form of homopolymers or copolymers prepared by copolymerizing a third component therewith.

As described above, the decorative sheets according to the present invention can be used for substrates having various color tones. Accordingly, it is important that the decorative sheet according to the present invention has a high hiding power such that the color tone of the substrate neither adversely affects that of the decorative sheet nor damage a high design value of the picture pattern formed therein. For this reason, in accordance with the present invention, the optical density of the polyester film used in the decorative sheet is 0.1 to 5.0. The afore-mentioned optical density of the polyester film is preferably 0.2 to 4.0, more preferably 0.5 to 3.0, still more preferably 1.3 to 3.0.

The hiding power which is represented in terms of the afore-mentioned optical density, can be imparted by incorporating inorganic or organic particles into the polyester film. Examples of the inorganic or organic particles include titanium dioxide, calcium carbonate, barium sulfate, aluminum oxide, silicon dioxide, carbon black, iron oxide, chromium oxide or the like. Any other particles than the above-exemplified ones can also be used in the present invention as far as they can satisfy the requirement for the above-defined optical density. Further, in order to enhance a dispersibility in polyester and a weather resistance of the resultant decorative plate, these particles may also be surface-treated with an oxide of aluminum, silicon, zinc or the like and/or an organic compound.

Alternatively, in order to impart the hiding power to the polyester film, isolated small cells or bubbles may also be incorporated therein. Specifically, the incorporation of the isolated small cells or bubbles in the polyester film may be performed by a method in which a small amount of polyolefin non-compatible with the polyester is added to the polyester and the blended material is then subjected to an elongation and a heat-set, or a method in which an inert gas is contained in the polyester film.

When the optical density of the polyester film is less than 0.1, the color tone of the substrate to which the polyester film is adhered, may adversely affect that of the picture pattern formed on the surface of the decorative sheet, thereby failing to accomplish the aim of the present invention. On the other hand, when the optical density of the polyester film is more than 5.0, the polyester film may often suffers from breakage upon the production thereof or be deteriorated in its mechanical strength.

By using the polyester film according to the present invention, the decorative sheet possessing the picture pattern having a high design value on the surface thereof can be formed without adverse influence by the color tone of the substrate. Accordingly, when the decorative sheet comprising the polyester film according to the present invention and a picture pattern is adhered to the surface of the substrate, it becomes possible to produce an excellent printed decorative plate. Also, the afore-mentioned decorative sheet is suitably applied to building materials, furniture, household appliances or the like. Further, in the production of the printed decorative plate, the polyester film may first be subjected, at the surface thereof, to a hiding-printing treatment and then to a picture-printing treatment. Alternatively, the polyester film on which the picture pattern have been printed, may be embossed and then covered with a top coat.

Since the polyester film according to the present invention exhibits an excellent hiding power, only a single polyester film can be used to produce a printed decorative sheet or plate. Also, the polyester film of two or more layers may be used for the production of decorative sheets or plates. For example, a plurality of the polyester films according to the present invention may be adhered to the surface of the substrate such as plywood. By such a multi-layer structure of the polyester film, the surface of the decorative sheet or decorative plate can be readily embossed.

If the decorative sheet has a deteriorated dimensional stability, wrinkles are generated thereon, resulting in damage to the high design value of the picture pattern. For this reason, in accordance with the present invention, it is required that the polyester film exhibits longitudinal and transverse heat shrinkage percentages both being not less than −10.0% and not more than +10.0% after heat-treated at 180° C. for 5 minutes. The afore-mentioned heat shrinkage percentages are preferably in the range of not less than −7.0 and not more than +7.0%. Especially, it is more preferred that the longitudinal heat shrinkage percentages is not less than −4.0% and not more than +4.0% and transverse heat shrinkage percentages is not less than −1.0% and not more than +1.0%. When the heat shrinkage percentages are less than −10%, i.e., when the elongation thereof exceeds 10%, the surface of the decorative sheet may be unsuitably swelled up, so that its appearance may be considerably deteriorated. On the other hand, when the heat shrinkage percentages are more than +10%, there may arise such problems that the decorative sheet is separated from surfaces of the building materials, furniture or the like, or the picture pattern is distorted.

Incidentally, wood materials have been favorably used for furniture, building materials, household appliances or the like. Specifically, ligneous color tones are favorably adopted because a space surrounded by such ligneous color tones, as seen in Japanese houses, contributes to mental rest or serenity of residents. In order to attain such effects, it is preferred that the polyester film itself have a color tone harmonious with the ligneous picture pattern in addition to the hiding power and the dimensional stability.

Further, the afore-mentioned polyester film according to the present invention can be also used as a film for the decorative plate laminated by clear film. Accordingly, the obtained decorative plate laminated by clear film can exhibit an excellent self-recovery for dent deformation (resistance to impact deformation) due to a peculiar property of the polyester film itself. Furthermore, it is preferable that the polyester film used as the film for the decorative plate laminated by clear film has longitudinal and transverse tensile moduli of not more than 600 kg/mm$^2$ from the standpoint of improving its suitability for V-cut processing. The longitudinal and transverse tensile moduli of the polyester film are preferably in the range of 190 to 550 kg/mm$^2$, more preferably 190 to 500 kg/mm$^2$.

If the longitudinal and transverse tensile moduli are more than 600 kg/mm$^2$, the polyester film may be apt to return back to its original flat shape due to the elastic deformation when subjected to V-cutting and bending finish processes, so that the bent shape of the polyester film may not be maintained stably for a long period of time. On the other hand, when the longitudinal and transverse tensile moduli of the polyester film are less than 190 kg/mm$^2$, there may be a tendency in which wrinkles or the like are caused in the polyester film due to a tension force thereof generated when it is adhered to the substrate, etc., so that the resulting decorative plate may suffer from a wavy surface.

The thickness of the polyester film according to the present invention is generally in the range of 5 to 100 μm, preferably 12 to 80 μm. When the thickness of the polyester film is less than 5 μm, the substrate may be highly susceptible to an impact applied to a surface of the decorative plate. As a result, especially if the substrate has a high surface hardness, a clear layer or a picture-printed layer formed on the surface of the decorative plate, which has a lower hardness than that of the substrate, may be more severely damaged. On the other hand, when the thickness of the polyester film is more than 100 μm, a force required for bending the polyester film is increased, so that it may be difficult to maintain the bent shape of the decorative plate. the surface of the decorative plate is caused to exhibit more bluish color tone the resultant decorative plate may have a desolate appearance, and therefore, the warm color tone inherent to a ligneous material may be damaged. In accordance with the present invention, the below-mentioned dyes and/or pigments can be incorporated into the polyester film.

Examples of the dyes include natural dyes such as indigo, or synthetic dyes such as azo dyes, anthraquinone dyes, indigoid dyes, sulfur dyes, triphenyl methane dyes, pyrazolone dyes, stilbene dyes, diphenyl methane dyes, xanthene dyes, alizarin dyes, acridine dyes, quinoneimine dyes (e.g., azine dyes, oxazine dyes or thiazine dyes), thiazole dyes, methine dyes, nitro dyes, nitroso dyes, cyanine dyes or the like, preferably anthraquinone dyes.

Examples of the pigments include organic pigments such as phthalocyanine-based pigments, dioxazine-based pigments, anthraquinone-based pigments or the like, or inorganic pigments such as titanium white, zinc white, white lead, carbon black, red oxide, vermilion, cadmium red, chrome yellow, ultramarine blue, cobalt blue, cobalt violet, zinc chromate or the like, preferably titanium white, carbon black or red oxide.

In accordance with the present invention, a method of adding the aforementioned particles, dyes and/or pigments to the polyester film is not particularly restricted but any known method can be used therefor.

The polyester film for the decorative plate, the decorative sheet or the decorative plate laminated by clear film according to the present invention comprises a polyester base film and a coating layer formed on at least one surface of the polyester base film. A coating material used for the preparation of a coating solution can be optionally selected from known coating materials. From the standpoint of adhesion to the polyester base film, it is preferred that the coating material contains at least one compound selected from the group consisting of a polyester resin, an acrylic resin, a polyurethane resin, an amino resin, an epoxy resin, an oxazoline resin and a coupling agent.

Examples of polycarboxylic acids as a constituent of the afore-mentioned polyester resin may include terephthalic acid, isophthalic acid, ortho-phthalic acid, phthalic acid, 4,4'-diphenyl dicarboxylic acid, 2,5-naphthalene dicarboxylic acid, 2,6-naphthalene dicarboxylic acid, 1,4-cyclohexane dicarboxylic acid, 2-potassium-sulfo-terephthalic acid, 5-sodium-sulfo-isophthalic acid, adipic acid, azelaic acid, sebacic acid, dodecane dicarboxylic acid, glutaric acid, succinic acid, trimellitic acid, trimesic acid, trimellitic anhydride, phthalic anhydride, p-hydroxy benzoic acid, monopotassium trimellitate, esterifiable derivatives thereof or the like. Among them, preferred polycarboxylic acids are terephthalic acid, isophthalic acid, 2,6-naphthalene dicarboxylic acid, 1,4-cyclohexane dicarboxylic acid or 5-sodium-sulfo-isophthalic acid.

Examples of polyhydroxy compounds as a constituent of the afore-mentioned polyester resin may include ethylene glycol, 1,2-propylene glycol, 1,3-propylene glycol, 1,3-propane diol, 1,4-butane diol, 1,6-hexane diol, 2-methyl-1, 5-pentane diol, neopentyl glycol, 1,4-cyclohexane dimethanol, p-xylene glycol, bisphenol A-ethylene glycol adduct, diethylene glycol, triethylene glycol, polyethylene glycol, polypropylene glycol, polytetramethylene glycol, polytetramethyleneoxide glycol, dimethylol propionic acid, glycerol, trimethylol propane, sodium dimethylolethyl sulfonate, potassium dimethylol propionate or the like. Among them, preferred polyhydroxy compounds are ethylene glycol, 1,4-butane diol, neopentyl glycol, 1,4-cyclohexane dimethanol, bisphenol A-ethylene glycol adduct, or polyethylene glycol.

The polyester resin can be synthesized by ordinary polycondensation of the afore-mentioned polycarboxylic acid and polyhydroxy compound. In addition to the afore-mentioned resins, composite polymers containing polyester components such as so-called acryl-grafted polyesters which is described in Japanese Patent Application Laid-Open (KOKAI) No. 1-165633, can also be used as the polyester resin.

The acrylic resins used in the present invention, may be polymers prepared from polymerizable monomers having carbon double bonds, such as typically acrylic or methacrylic monomers. These polymers may be in the form of homopolymers or copolymers. Further, copolymers of the afore-mentioned polymers with the other polymers can also used as the acrylic resins. Examples of the other polymers may include polyesters, polyurethanes, epoxy resins or the like. The copolymers may be in the form of block copolymers, graft copolymers or the like.

Furthermore, in the present invention, there can also be used polymers obtained by polymerizing polymerizable monomers having carbon double bonds in a polyester solution or a polyester dispersion (occasionally, a mixture of these polymers), polymers obtained by polymerizing polymerizable monomers having carbon double bonds in a polyurethane solution or a polyurethane dispersion (occasionally, a mixture of these polymers), or polymers obtained by polymerizing polymerizable monomers having carbon double bonds in a solution or dispersion containing the other polymers (occasionally, a mixture of these polymers).

Typical examples of the afore-mentioned polymerizable monomers having carbon double bonds may include various carboxyl-containing monomers such as acrylic acid, methacrylic acid, crotonic acid, itaconic acid, fumaric acid, maleic acid, citraconic acid, or salts thereof; various hydroxyl-containing monomers such as 2-hydroxy-ethyl-acrylate, 2-hydroxy-ethyl methacrylate, 2-hydroxy-propyl acrylate, 2-hydroxy-propyl mathacrylate, 4-hydroxy-butyl acrylate, 4-hydroxy-butyl methacrylate, monobutyl-hydroxy fumarate or monobutyl-hydroxy itaconate; various acrylic or methacrylic esters such as methyl acrylate, methyl methacrylate, ethyl acrylate, ethyl methacrylate, propyl acrylate, propyl methacrylate, butyl acrylate, butyl methacrylate, lauryl acrylate or lauryl methacrylate; various nitrogen-containing vinyl-based monomers such as acrylamide, methacrylamide, diacetone acrylamide, N-methylol acrylamide, acrylonitrile or methacrylonitrile; various styrene derivatives such as styrene, α-methyl styrene, divinyl benzene or vinyl toluene; various vinyl esters such as vinyl acetate or vinyl propionate; various silicon-containing polymerizable monomers such as γ-methacryloxy-propyl-trimethoxy silane, vinyl-trimethoxy silane or "THYRAPRENE FM-07", produced by Chisso Corporation. (methacrylyl silicon macromer); phosphorus-containing vinyl-based monomers; various vinyl halides such as vinyl chloride, vinylidene chloride, vinyl fluoride, vinylidene fluoride, trifluorochloroethylene, tetrafluoroethylene, chlorotrifluoroethylene, hexafluoropropylene; various conjugated dienes such as butadiene; or the like. Among them, preferred polymerizable monomers having carbon double bonds are acrylic acid, methacrylic acid, 2-hydroxy-ethyl-acrylate, 2-hydroxy-ethyl methacrylate, methyl acrylate, methyl methacrylate, ethyl acrylate, ethyl methacrylate, butyl acrylate, butyl methacrylate, acrylamide, N-methylol acrylamide, acrylonitrile or styrene.

As methods for polymerization of the afore-mentioned acrylic or methacrylic monomers, there can be exemplified a method of mixing an organic solvent, the monomer and a polymerization initiator together and heating the mixture while stirring so as to conduct the polymerization of the monomer, a high-pressure polymerization method using an autoclave, emulsion-type or suspension-type polymerization method in which water is used instead of an organic solvent, if required together with a surfactant, or the like.

Examples of the afore-mentioned polymerization initiators may include inorganic peroxides such as ammonium persulfate or hydrogen peroxide; acyl peroxides such as benzoyl peroxide; various alkyl hydroperoxides such as tert-butyl hydroperoxide or p-menthane hydroperoxide; various dialkyl peroxides such as di-tert-butyl peroxide; various azo-based compounds such as azo-bis-isobutylonitrile or azo-di-tert-butane; or the like.

The afore-mentioned inorganic or organic peroxide can be used in combination with a reducing agent to form a so-called redox-series catalyst. In this case, the respective components can be composed of a single compound or a plurality of compounds in combination. Incidentally, as the reducing agents, there can be used, for example, organic amines, L-ascorbic acid, L-sorbic acid, cobalt naphthenate, cobalt octanoate, iron naphthenate, iron octanoate or the like.

As the polyurethane resins used in the present invention, there can be exemplified known polyurethane resins or derivatives thereof as described in Japanese Patent Publications (KOKOKU) Nos. 42-24194, 46-7720, 46-10193 and 49-37839, and Japanese Patent Applications Laid-Open (KOKAI) Nos. 50-123197, 53-126058 and 54-138098. The derivatives of the polyurethane resins may include, for example, isocyanate-terminated urethane prepolymers or blocked compounds thereof (occasionally referred to as "Blocked isocyanate").

Examples of the polyisocyanates may include tolylene diisocyanate, phenylene diisocyanate, 4,4'-diphenyl methane diisocyanate, hexamethylene diisocyanate, xylylene diisocyanate, 4,4'-dicyclohexyl methane diisocyanate, isophorone diisocyanate, or the like. Among them, the preferred polyisocyanates are tolylene diisocyanate or isophorone diisocyanate.

Examples of the polyols may include polyether-polyols such as polyoxyethylene glycol, polyoxypropylene glycol or polyoxytetramethylene glycol; polyester-polyols such as polyethylene adipate, polyethylene butylene adipate or polycaprolactone; acryl-based polyols; castor oil; or the like. Among them, the preferred polyols are polyoxyethylene glycol, polyoxytetramethylene glycol or polyester-polyols. In general, there can be used polyols having a molecular weight of 300 to 2,000.

Examples of chain-lengthening agents or cross-linking agents may include ethylene glycol, propylene glycol, butane diol, diethylene glycol, trimethylol propane, hydrazine, ethylenediamine, diethylene triamine, 4,4'-diamino-diphenyl methane, 4,4'-diamino-dicyclo-hexyl methane, water or the like.

The afore-mentioned polyurethane resins preferably contain anionic substituent groups such as $-SO_3H$, $-OSO_3H$, $-COOH$, or ammonium salts, alkali metal salts or alkali earth metal salts of these substituent groups in order to enhance a solubility thereof in a solvent comprising mainly water. These polyurethane resins can be produced, for example, by the below-mentioned methods (1) to (3).

(1) Production method in which compounds having anionic substituent groups are used as the polyisocyanate, the polyol, the chain-lengthening agent or the like:

For example, the polyisocyanate containing anionic substituent groups can be produced by sulfonating an aromatic isocyanate compound. In addition, isocyanate compounds containing groups derived from sulfates of amino alcohols or diamino-carboxylates can also be used for the above purpose.

(2) Production method in which a compound containing anionic substituent groups is reacted with unreacted isocyanate groups of the produced polyurethane:

As the compounds containing anionic substituent groups, there can be used those compounds containing groups derived from, for example, bisulfite, amino-sulfonic acid or salt thereof; amino-carboxylic acid or salts thereof; sulfates of amino alcohol or salts thereof; hydroxyacetic acid or salts thereof; or the like.

(3) Production method in which an active hydrogen-containing group of the polyurethane such as —OH or —COOH is caused to react with a specific compound:

As the specific compounds, there can be exemplified dicarboxylic anhydrides, tetracarboxylic anhydrides, sultone, lactone, epoxy-carboxylic acids, epoxy-sulfonic acid, 2,4-dioxo-oxazoline, isatoic anhydride, phostone or the like. Further, cyclic compounds having 3- to 7-membered ring, which contain a salt-type group such as carbyl sulfate or a group capable of forming a salt after opening of the ring, can also be used as the specific compounds.

The amino resins used in the present invention may include polymers or prepolymers which are obtained by reacting an amino compound or an amido compound with an aldehyde, or derivatives thereof.

Examples of the amino compounds or amido compounds as a skeleton of the amino resin may include urea, thio urea, ethylene urea, dihydroxy ethylene urea, triazones, melamine, iso-melamine, benzoguanamine, glycol ureyl, acetoguanamine, guanyl melamine, dicyan-diamide, homopolymers of dicyan-diamide, copolymers of dicyan-diamide, aminoacryl (acryl- or methacryl-based monomers containing amino groups), homopolymers of aminoacryl, copolymers of aminoacryl, aniline or the like. Among them, the preferred amino or amido compounds are urea, melamine, benzoguanamine or copolymers of aminoacryl. In addition, examples of the aldehydes used for the production of the amino resins may include formaldehyde, glyoxal or the like. Among them, the preferred aldehydes are formaldehyde.

Examples of the polymers or prepolymers obtained by reacting the amino compound or the amido compound with the aldehyde, may include monomethylol urea, dimethylol urea, trimethylol urea, tetramethylol urea, methylene urea, methylol methylene urea, methylol methylene urea trimer, monomethylol melamine, dimethylol melamine, trimethylol melamine, tetramethylol melamine, pentamethylol melamine, hexamethylol melamine, monomethylol benzoguanamine, dimethylol benzoguanamine, trimethylol benzoguanamine, tetramethylol benzoguanamine, monomethylol glycol ureyl, dimethylol glycol ureyl, trimethylol glycol ureyl, tetramethylol glycol ureyl, homopolymers of N-methylol acrylamide, copolymers of N-methylol acrylamide or the like. Some of these compounds are occasionally called "methylol-added amino resins". Among them, the preferred polymers or prepolymers are tetramethylol urea, trimethylol melamine, tetramethylol melamine, pentamethylol melamine, hexamethylol melamine or copolymers of N-methylol acrylamide.

Further, examples of the derivatives of the aforementioned polymers or prepolymers may include monomethoxy-methyl urea, monobutoxy-methyl urea, dimethoxy-methyl urea, dibutoxy-methyl urea, trimethoxy-methyl urea, tributoxy-methyl urea, tetramethoxy-methyl urea, tetrabuoxy-methyl urea, monomethoxy-methyl melamine, monobutoxy-methyl melamine, dimethoxy-methyl melamine, dibutoxy-methyl melamine, trimethoxy-methyl melamine, tributoxy-methyl melamine, tetramethoxy-methyl melamine, tetrabutoxy-methyl melamine, pentamethoxy-methyl melamine, pentabutoxy-methyl melamine, hexamethoxy-methyl melamine, hexabutoxy-methyl melamine, monomethoxy-methyl benzoguanamine, monobutoxy-methyl benzoguanamine, dimethoxy-methyl benzoguanamine, dibutoxy-methyl benzoguanamine, trimethoxy-methyl benzoguanamine, tributoxy-methyl benzoguanamine, tetramethoxy-methyl benzoguanamine, tetrabutoxy-methyl benzoguanamine, monomethoxy-methyl glycol ureyl, monobutoxy-methyl glycol ureyl, dimethoxy-methyl glycol ureyl, dibutoxy-methyl glycol ureyl, trimethoxy-methyl glycol ureyl, tributoxy-methyl glycol ureyl, tetramethoxy-methyl glycol ureyl, tetrabutoxy-methyl glycol ureyl, homopolymers of N-methoxy-methyl acrylamide, copolymers of N-methoxy-methyl acrylamide, homopolymers of N-butoxy-methyl acrylamide, copolymers of N-butoxy-methyl acrylamide or the like. Some of these compounds are called "alkyl-etherified amino resins". Among them, the preferred derivatives of the polymers or prepolymers are tetramethoxy-methyl urea, trimethoxy-methyl melamine, tributoxy-methyl melamine, tetramethoxy-methyl melamine, tetrabutoxy-methyl melamine, pentamethoxy-methyl melamine, pentabutoxy-methyl melamine, hexamethoxy-methyl melamine, hexabutoxy-methyl melamine or copolymers of N-methoxy-methyl acrylamide.

Incidentally, from the industrial viewpoint, compounds having an intermediate structure between the aforementioned compounds are included in categories of amino resins. As a matter of course, these intermediate compounds can also be used as the amino resins in the present invention. As the industrially available amino resins, there can be exemplified urea resins, melamine resins, benzoguanamine resins, glycol ureyl resin, co-condensation products thereof, co-condensation product of these resins with other resins (e.g., alkyd resins) such as amino alkyd resins, or the like. An example of the melamine resins industrially produced is a co-condensation product of melamine, formaldehyde and methanol (or butanol). Accordingly, various melamine resins can be produced by varying the ratio between melamine, formaldehyde and methanol (or butanol). In this case, methanol and butanol may be used in combination.

The self-curing reaction of the amino resins and the reaction of the amino resins with the other functional groups can be accelerated by heating or by the presence of catalysts. As the useful catalysts, there can be used inorganic or organic acids. Specific examples of the inorganic or organic acids may include phosphoric acid, hydrochloric acid, sulfuric acid, methane sulfonic acid, p-toluene sulfonic acid, dodecylbenzene sulfonic acid, dinonyl-naphthalene sulfonic acid, dinonyl-naphthalene disulfonic acid, partial salts of these acids, partial esterification products of these acid, ammonium salts of these acids, amine salts of these acids or the like.

The epoxy resins used in the present invention may include compounds having an epoxy group in molecules thereof, prepolymers of these compounds and cured products of these compounds. A typical example of the epoxy resins is a condensate of epichlorohydrin and bisphenol A. Especially, a reaction product of a low-molecular weight polyol and epichlorohydrin is an epoxy resin showing an excellent water-solubility. However, in the present invention, it is not necessarily required that the epoxy resins used are water-soluble. For example, water-dispersion-type epoxy resins or solvent-soluble-type epoxy resins can also be suitably used in the present invention.

Specific examples of the epoxy resins may include sorbitol polyglycidyl ether, sorbitan polyglycidyl ether, polyglycerol polyglycidyl ether, pentaerythritol polyglycidyl ether, diglycerol polyglycidyl ether, triglycidyl-tris(2-hydroxyethyl) isocyanurate, glycerol polyglycidyl ether, trimethylol propane polyglycidyl ether, resorcin diglycidyl ether, neopentylglycol diglycidyl ether, 1,6-hexane diol diglycidyl ether, ethylene glycol diglycidyl ether, polyethylene glycol diglycidyl ether, propylene glycol diglycidyl ether, polypropylene glycol diglycidyl ether, polytetramethylene glycol diglycidyl ether, adipic acid diglycidyl ether, orthophthalic acid diglycidyl ether, hydroquinone diglycidyl ether, bisphenol-S diglycidyl ether, glycidyl terephthalate, diburomo-neopentyl glycol diglycidyl ether, or the like. Among them, the preferred epoxy resins are polyglycerol polyglycidyl ether, glycerol polyglycidyl ether or trimethylol propane polyglycidyl ether.

As the commercially available products of epoxy resin emulsions, there can be exemplified "DENACOL EM-125", "DENACOL EX-1101", "DENACOL EX-1102" "DENACOL EM-1103" all produced by NAGASE KASEI KOGYO CO., LTD., or the like.

The oxazoline resins (polymers of oxazoline compounds) used in the present invention mean polymers obtained by using at least one oxazoline compound as a raw monomer, or polymers having at least one oxazoline ring therein. Examples of the oxazoline compounds may include 2-oxazoline compounds, 3-oxazoline compounds, 4-oxazoline compounds or the like. Among them, 2-oxazoline compounds are preferable because they show a high reactivity and, therefore, are industrially put into practice.

Vinyl oxazolines can be readily subjected to radical polymerization in the presence of azo-isobutylonitrile (AIBN) or benzoyl peroxide (BPO) to produce polymers having an oxazoline ring on a side chain thereof. Also, the vinyl oxazolines can produce similar polyvinyloxazolines when subjected to an anionic polymerization in which a catalyst such as n-butyl lithium is used. On the other hand, when the vinyl oxazolines are subjected to a cationic polymerization in which a catalyst such as oxazolium salts or trifluoromethane sulfonic acid is used, polymers having acrylamide or methacrylamide group on a side chain thereof can be produced.

The polymers having an oxazoline ring on the side chain thereof or the polymers having an acrylyl or methacrylyl group on the side chain thereof can cause a cross-linking reaction between the side chains to produce a cross-linked polymer. As a matter of course, in the afore-mentioned polymerization processes, monomers having no oxazoline ring can be introduced to produce copolymers of the vinyl oxazolines.

Examples of the coupling agents used in the present invention may include silicon-based coupling agents, titanium-based coupling agents, zirconium-based coupling agents, aluminum-based coupling agents, zirconium/aluminum-based coupling agents or derivatives thereof. Among them, the preferred coupling agents are silicon-based coupling agents or titanium-based coupling agents.

As the silicon-based coupling agents, there can be exemplified so-called silane coupling agents, alkyl(phenyl)alkoxysilane, alkylsilicate(alkoxysilane), chlorosilane or the like. Among these silicon-based coupling agents, the silane coupling agents are preferred. The "silane coupling agent" generally means those compounds which have organic functional groups exhibiting an especially high reactivity or affinity to organic polymers, among silane compounds having organic functional groups each bonded to a silicon atom through a carbon atom (carbon-functional silanes). In other words, the silane coupling agents include such silane compounds having a reactive functional group such as typically an amino group, an epoxy group, a vinyl group, a methacryl group or a mercapto group, and a hydrolyzable group such as typically an alkoxy group, e.g., a methoxy group, an ethoxy group and an isopropenoxy group, which groups are bonded respectively to the silicon atom.

Specific examples of the silane coupling agents may include γ-(2-aminoethyl)aminopropyl-trimethoxy silane, γ-(2-aminoethyl)aminopropyl-methyldimethoxy silane, γ-methacryloxypropyl-trimethoxy silane, a salt of hydrochloric acid and N-β-(N-vinylbenzyl-aminoethyl)-γ-aminopropyl-trimethoxy silane, γ-glycidoxypropyl-trimethoxy silane, γ-mercaptopropyl-trimethoxy silane, vinyl-triacetoxy silane, γ-chloropropyl-trimethoxy silane, γ-anilinopropyl-trimethoxy silane, vinyl-trimethoxy silane, octadecyl-dimethyl[3-(trimethoxysilyl)propyl]ammonium chloride, γ-chloropropylmethyl-dimethoxy silane, γ-mercaptopropylmethyl-dimethoxy silane, vinyl-tris(β-methoxyethoxy) silane, β-(3,4-epoxycyclohexyl)ethyl-trimethoxy silane, ureid-propyl-trimethoxy silane, triaminopropyl trimethoxy silane, γ-4,5-dihydro-imidazole-propyl-trimethoxy silane, γ-cyanopropyl-trimethoxy silane, or the like.

Many of the afore-mentioned compounds are so-called three-functional silane coupling agents having three hydrolyzable groups such as typically alkoxy groups, which are bonded to the silicon atom. However, in the present invention, such compounds having not more than two alkoxy groups bonded to the silicon atom can also be usefully used as the silane coupling agent. In addition, reaction products of the afore-mentioned compounds, for example, oligomers as condensates of the afore-mentioned compounds or reaction products of the afore-mentioned compounds with polyvinyl alcohol or the like can also be effectively used as the silane coupling agent. Further, so-called polymer-type silane coupling agents can also be used in the present invention.

The "polymer-type silane coupling agents" are compounds having both the reactive functional group and the hydrolyzable group such as typically an alkoxy group on the side chain of poly-dimethyl siloxane. Specific examples of the polymer-type silane coupling agents may include "MAC 2101", (Tradename) produced by NIPPON UNIKER CO., LTD. (poly-dimethyl siloxane containing an alkoxy group, an epoxy group and a polyether group), "MAC 2301", (Tradename) produced by NIPPON UNIKER CO., LTD. (poly-dimethyl siloxane containing an alkoxy group, a hydroxy group and a polyether group), or the like.

As the titanium-based coupling agents, there can be exemplified so-called usual titanium coupling agents, alkyl titanate, titanium chelate compounds or the like. Among them, the titanium coupling agents are preferred.

Examples of the titanium coupling agents may include isopropyl-tri-isostearoyl titanate, isopropyl-tridodecylbenzene-sulfonyl titanate, isopropyl-tris(dioctyl-pyrophosphate)-titanate, tetra-isopropyl-bis (dioctyl-phosphite)-titanate, tetra-octyl-bis (di-tridecyl-phosphite)-titanate, tetra (2,2-diallyloxy-methyl-1-butyl-bis(di-tridecyl-phosphite)-titanate, bis(dioctyl-pyrophosphate)-oxy-acetate titanate, bis(dioctyl-pyrophosphate)-ethylene titanate, isopropyl-trioctanoyl titanate, isopropyl-dimethacrylisostearyl titanate, isopropyl-isostearoyl-diacryl titanate, isopropyl-tri(dioctyl phosphate)-titanate, isopropyl-tricumylphenyl titanate, isopropyl-tri(N-amidoethyl-aminoethyl)-titanate, dicumylphenyl-oxy-acetate titanate, di-isostearoyl-ethylene titanate or the like.

As the zirconium-based coupling agents, there can be used alkyl zirconates, zirconium chelate compounds or the like. Examples of the alkyl zirconates may include zirconium butyrate, zirconium acetyl acetonate, acetyl acetone zirconium butyrate, zirconium lactate, zirconium stearate butyrate or the like. Examples of the zirconium chelate compounds may include zirconium di-isopropoxide-dimethyl acetoacetate or the like.

As the aluminum-based coupling agents, there can be used alkyl aluminates, aluminum chelate compounds or the like. Examples of the alkyl aluminates which is "aluminum acid ester" may include trimethoxy aluminum, triethoxy aluminum, tri-isopropoxy aluminum, tri-benzyl alkoxy aluminum or the like. Examples of the aluminum chelate compounds may include aluminum-di-n-butoxide-mono-ethyl acetoacetonate, aluminum-di-n-butoxide-mono-methyl aceroacetonate, aluminum-di-isobutoxide-mono-methyl acetoacetonate, aluminum-di-sec-butoxide-mono-ethyl acetoacetonate, aluminum-di-isopropoxide-mono-ethyl acetoacetonate or the like.

As the zirconium/aluminum-based coupling agents, so-called zircoaluminate coupling agents can be exemplified. The zircoaluminate coupling agents are reactive compounds containing zirconium and aluminum. Examples of the commercially available products of the zircoaluminate coupling agents may include "CAVCO MOD A", "CAVCO MOD C", "CAVCO MOD C-1", "CAVCO MOD F", "CAVCO MOD M", "CAVCO MOD S", "CAVCO MOD APG", "CAVCO MOD CPG", "CAVCO MOD CPM", "CAVCO MOD FPM", "CAVCO MOD MPG" and "CAVCO MOD MPM" (Tradenames) all produced by CAVEDON CHEMICAL CO., INC., or the like.

As the derivatives of the coupling agents, there can be exemplified at least partially hydrolyzed products of the afore-mentioned compounds, condensates containing at least one of these compounds and the hydrolyzates thereof, reaction products of these compounds with other compounds, e.g., a reaction product of polyvinyl alcohol with the partially-hydrolyzed product of the silane coupling agent, or the like.

In accordance with the present invention, the coating layer formed on the polyester base film may contain various other compounds in addition to the afore-mentioned compounds. Examples of the other compounds may include binder polymers except for those mentioned above, cross-linking agents except for those mentioned above, fillers or particles, waxes, anti-static agents, surfactants, anti-foaming agents, coating property-improving agents, thickening agents, anti-oxidants, ultraviolet light absorbers, foaming agents, dyes, pigments or the like. The content of the other compound is generally not more than 50% by weight based on the total weight of the coating layer.

The coating solution used for forming the coating layer of the present invention is preferably an aqueous solution using water as a solvent from the standpoint of safety and hygiene, but it may contain an organic solvent as an assistant for water-soluble or water-dispersible resins. Further, a coating solution prepared by using an organic solvent solely can also be used in the present invention. In the case where the solvent mainly comprises water, the coating solution may be produced by forcibly dispersing the afore-mentioned compounds in water. However, it is preferred that the coating solution is of a self-dispersion type from the standpoint of dispersion stability thereof.

The self-dispersion-type coating solution can be prepared from a coating material comprising the afore-mentioned compounds into which hydrophilic groups are introduced. Examples of the hydrophilic groups introduced may include nonionic groups such as a hydroxyl group or a polyether group, anionic groups such as groups derived from sulfonic acid, carboxylic acid phosphoric acid or salts thereof, and cationic groups such as onium salts, e.g., quaternary ammonium salts. As the methods for introducing the hydrophilic groups into the compounds, there can be adopted various copolymerization reactions including graft polymerization or the like.

Among the afore-mentioned coating materials, water-soluble or water-dispersible coating materials containing anionic groups are especially preferable. The lower limit of content of the anionic groups in the coating material is generally 0.05% by weight from the standpoint of imparting water-solubility or water-dispersibility thereto. On the other hand, the upper limit of content of the anionic groups in the coating material is not particularly restricted. However, in the case where the coating material comprises polyester, the upper limit of content of the anionic groups in the coating material is preferably 15% by weight from the standpoint of producing a high-molecular weight polyester having a sufficient film strength. Incidentally, the "content" of the anionic groups in the coating material means a weight percentage of anionic radicals excluding counter ions relative to the compound constituting the coating material.

The methods of applying the coating solution prepared from the afore-mentioned coating material onto the polyester film as a base film may include, for example, those using a reverse-roll coater, a gravure coater, a rod coater, an air-doctor coater or other coating devices as described in Yuji HARASAKI, "Coating System" published by MAKI SHOTEN, 1979.

In accordance with the present invention, the coating layer is preferably formed by an in-line coating method. The in-line coating method comprises applying the coating solution onto a polyester film during the production of the polyester film. More specifically, the coating solution can be applied onto the polyester film at an optional stage between melt-extrusion of a raw polyester material and winding-up of resultant films which have been biaxially stretched and then heat-set. In general, the coating solution can be applied onto any of a substantially amorphous unstretched sheet obtained by rapidly cooling the melt-extruded polyester, a uniaxially-stretched film obtained by stretching the unstretched film in the longitudinal direction thereof, and a biaxially-stretched film before heat-setting. Among them, the method of applying the coating solution onto the uniaxially-stretched film and then stretching the film in the transverse direction thereof is preferred. Such a method is advantageous in production cost, because the production of the polyester film can be conducted simultaneously with the coating and drying of the coating solution. In addition, in the afore-mentioned method, since the polyester film is stretched after applying the coating material thereto, the resultant coating layer can be readily formed into a thin film. Further, since the polyester film onto which the coating layer has been formed can be subjected to such a high-temperature heat-treatment which cannot be achieved by the other methods, the resultant coating layer and the polyester film are firmly bonded to each other.

The thickness of the coating layer after drying is generally in the range of 0.001 to 10 $\mu$m, preferably 0.010 to 5 $\mu$m, more preferably 0.015 to 2 μm. When the thickness of the coating layer is less than 0.001 μm, the polyester film for decorative plate or decorative sheet may not be sufficiently adhered to the substrate. On the other hand, when the thickness of the coating layer is more than 10 μm, the coating layer may act like an adhesive, so that the film rolled up may tend to suffer from so-called blocking, thereby causing portions of the rolled-up film to be bonded to each other.

When the polyester film for decorative plate or decorative sheet according to the present invention is laminated onto the substrate, an optional adhesive can be used for the adhesion therebetween. Examples of the adhesives may include urea resin-based adhesives, melamine resin-based adhesives, phenol resin-based adhesives, α-olefin resin-based adhesives, adhesives comprising a mixture of a water-soluble polymer and isocyanate, epoxy-based adhesives, solvent-type vinyl acetate resin-based adhesives, emulsion-type vinyl acetate resin-based adhesives, acryl emulsion-type adhesives, hot-melt adhesives, cyanoacrylate-based adhesives, polyurethane-based adhesives, chloroprene rubber-based adhesives, nitrile rubber-based adhesives, SBR-based adhesives, modified rubber emulsion-based adhesives, ethylene copolymer resin-based adhesives, resorcin-based adhesives, natural rubber-based adhesives, cellulose-based adhesives, starch glue, dextrin or the like.

In the case where the substrate comprises a wood material, in order to adhere the polyester film to such a substrate, there can be mainly used urea resin-based adhesives, melamine resin-based adhesives, α-olefin resin-based adhesives, adhesives comprising a mixture of a water-soluble polymer and isocyanate, emulsion-type vinyl acetate resin-based adhesives, acryl emulsion-type adhesives, chloroprene rubber-based adhesives, modified rubber emulsion-based adhesives or cellulose-based adhesives.

Examples of the commercially-available products of the urea resin-based adhesives may include "UROID 310", "UROID 320", "UROID 701", "UROID 755" or "UROID 730" all produced by MITSUI TOATSU CHEMICAL CO., LTD., or the like. Examples of the commercially-available products of the melamine resin-based adhesives may include melamine/urea resin-type adhesives such as "UROID 350", "UROID 775", "UROID 781", "STRUCTBOND C-1" or "STRUCTBOND C-10" all produced by MITSUI TOATSU CHEMICAL CO., LTD., melamine/phenol resin-type adhesives such as "UROID 883" or "UROID 811" both produced by MITSUI TOATSU CHEMICAL CO., LTD., or the like.

Examples of the commercially-available products of the phenol resin-based adhesives may include "UROID PL-261", "UROID PL-281", "UROID PL-211" or "UROID PL-222" all produced by MITSUI TOATSU CHEMICAL CO., LTD., "PR22" produced by KONISHI CO., LTD., or the like. Examples of the commercially-available products of the α-olefin resin-based adhesives may include "SH2", "SH3", "SH5W", "SH6", "SH20" or "SH20L2" all produced by KONISHI CO., LTD., or the like. Examples of the commercially-available products of the adhesives comprising a mixture of water-soluble polymer and isocyanate may include "CU1", "CU5" or "CU51" all produced by KONISHI CO., LTD., or the like.

Examples of the commercially-available products of the epoxy resin-based adhesives may include "S-DEIN 3008", "S-DEIN 3200", "S-DEIN 3710", "S-DEIN 3730", "S-DEIN 3740", "S-DEIN 3750", "S-DEIN 3600", "S-DEIN 3611" or "S-DEIN 3450" all produced by SEKISUI CHEMICAL INDUSTRY CO., LTD., or the like. Examples of the commercially-available products of the solvent-type vinyl acetate resin-based adhesives may include "S-DEIN 1011", "S-DEIN 1013", "S-DEIN 1015", "S-DEIN 1020" or "S-DEIN 1057" all produced by SEKISUI CHEMICAL INDUSTRY CO., LTD., or the like.

Examples of the commercially-available products of the emulsion-type vinyl acetate resin-based adhesives may include "656", "605", "EM-65", "EM-90" or "60-2(T)" all produced by CEMEDEIN CO., LTD., "S-DEIN 5100", "S-DEIN 5165", "S-DEIN 5200", "S-DEIN 5300", "S-DEIN 5301", "S-DEIN 5320", "S-DEIN 5400", "S-DEIN 5403", "S-DEIN 5405", "S-DEIN 5406", "S-DEIN 5408", "S-DEIN 5410", "S-DEIN 5440", "S-DEIN 5500", "S-DEIN 5700", "S-DEIN 5800", "S-DEIN 5803" or "S-DEIN 5815" all produced by SEKISUI CHEMICAL INDUSTRY CO., LTD., "CH2", "CH2W", "CH3", "CH5", "CH18", "CH20", "CH7", "CH7L", "CH27", "CH1000", "CH63", "CH65", "CH131", "CH133", "CH115", "CX10", "CX55", "CH1500", "CH1600", "CH3000L", "CH72", "CH73", "CH74", "CH77", "CH107 with a curing agent", "PTS(A/B)" or "CH7000/PTS7000" all produced by KONISHI CO., LTD., or the like.

Examples of the commercially-available products of the acryl emulsion-based adhesives may include "EM-315", "EM-370A.B", "MORCORN-685", "EM-326", "679" or "EM-702(new)" all produced by CEMEDEIN CO., LTD., "CEL10", "CEL20", "CEL22", "CEL25N", "CEL60", "CEL63", "CVC33", "CVC36", "CVC36F", "CV3105 series", "SP65", "SP85", "SP200", "SP210", "SP220", "SP281", "SP285", "SP290", "SP291", "SP3055", "CN520", "CZ100", "CZ220", "CE780", "CE801", "NEDABOND A" or "NEDABOND W1000" all produced by KONISHI CO., or the like.

Examples of the commercially-available products of the chloroprene rubber-based adhesives may include "S-DEIN 276AL", "S-DEIN 276FS", "S-DEIN 276M", "S-DEIN SG202D", "S-DEIN 278", or "S-DEIN SG2005E" all produced by SEKISUI CHEMICAL INDUSTRY, CO., LTD., "G10", "G11", "G12", "SUPER-G ACE", "G17", "G18", "G19", "G5000", "G5800", "GS5", "GU55 BLUE", "GU68-F GREEN", "G77", "G78", "NEDABOND-G", "SUPER-G SPRAY" or "GW150" all produced by KONISHI CO., LTD., or the like.

Examples of the commercially-available products of the modified rubber emulsion-based adhesives may include "CL-5N" or "CL-7N" both produced by CEMEDEIN CO., LTD., "FL200", "FL105S", "HB2" or "HB10" all produced by KONISHI CO., LTD., or the like. Examples of the commercially-available products of the resorcin-based adhesives may include "KR15" produced by KONISHI CO., LTD., or the like. Examples of the commercially-available products of the cellulose-based adhesives may include "WORKING BOND(K)" produced by KONISHI CO., LTD., or the like.

As mentioned above, in accordance with the present invention, there can be provided the polyester film for decorative plate or decorative sheet, which is free from environmental pollution upon burning such as incineration and adverse influence by the color tone of the substrate, and which is capable of producing a picture pattern having a high design value and excellent in dimensional stability and adhesion to the substrate.

Further, in accordance with the present invention, there is also provided the film for decorative plate laminated by clear film, which can be considerably improved in suitability for V-cut processing, in resistance to impact deformation and in adhesive property, and which is free from environmental pollution upon burning such as incineration.

EXAMPLES

The present invention is described in more detail below by way of examples, but these examples are not intended to limit the present invention, and various modifications and changes thereof can be achieved without departing from the scope of the present invention. Incidentally, unless otherwise specified, "parts" and "%" used in the following Examples and Comparative Examples represent "parts by weight" and "% by weight", respectively.

The measuring methods used in the following Examples and Comparative Examples are as follows.

(1) Optical Density (Hiding Power)

The optical density of the polyester film has been determined by measuring an intensity of light transmitted through a G filter by a Macbeth illuminometer (TD-904 Model). It is indicated that the larger the optical density is, the higher the hiding power becomes.

(2) Heat Shrinkage Percentage

A sample film having a width of 25 mm and a length of 1.0 m was placed in a circulating hot air oven (manufactured by TABAIESPECK CO., LTD.) and subjected to free end-heat treatment at 100° C. for 5 minutes. The ratio of longitudinal dimension of the sample film after the heat-treatment to that before the heat-treatment was represented by %.

(4) Suitability for Decorative Sheet

A decorative sheet was adhered to a plywood, which was a black flat surface substrate, by using an ethylene/vinyl acetate-based adhesive ("CVC-36", produced by KONICA CO., LTD.) as an adhesive to prepare a decorative plate. A picture pattern printed on a surface of the decorative sheet were observed to determine whether or not the picture pattern suffered from any change in color tones and any deterioration in design value. The results of the observation were classified into the following three ranks:

○: Printed picture pattern were kept in a good condition without any deterioration in its design value.

X: Considerable change in color tone of the printed picture pattern and considerable deterioration in design value thereof were caused.

Δ: Picture pattern were in an intermediate condition between the above two ranks.

Further, the decorative plate was placed in a circulating hot air oven (manufactured by TABAIESPECK CO., LTD.), and heat-treated at 180° C. for 5 minutes. The heat-treated decorative sheet was then observed with respect to its surface condition. The results of the observation were classified into the following two ranks:

○: Decorative sheet was kept in a good surface condition without any change.

X: Wrinkles or shrinkage were caused on the surface of the decorative sheet.

Furthermore, a surface of another decorative sheet was embossed at 150° C. with a roll having protrusions on a surface thereof. The results were classified into the following ranks:

◎: The embossing was especially easy to perform.

○: The embossing was readily performed.

X: The embossing was difficult to perform.

(7) Adhesion Property

The adhesion of the polyester film produced according to the present invention to plywood was measured and evaluated by the below-mentioned testing methods. Samples to be measured were prepared as follows. First, an adhesive was uniformly coated on the plywood in an amount of 110 g/m² in wet condition. Next, the polyester film was superimposed and adhered over the plywood coated with the adhesive such that its surface to be evaluated faces toward the adhesive on the plywood. The thus-obtained sample was allowed to stand for one hour while applying a pressure of 2 kg/cm² thereto by a pressing machine. Thereafter, the sample was removed from the pressing machine and allowed to stand for one day at room temperature. Using the thus-obtained sample, the adhesion property of the polyester film was evaluated in the following manner.

(7-1) Manual Peeling Test

The polyester film of the sample was manually peeled from the plywood to visually observe the peeled surfaces thereof. The results of the observation were classified into the following ranks:

○: The plywood underwent ply-separation;

X: The polyester film and the plywood were separated from each other at the boundary surface therebetween; and Δ: Both the afore-mentioned conditions were caused simultaneously.

In accordance with the present invention, the polyester films classified into either of the ranks "○" and "Δ" are suitable.

(7-2) High-temperature Creep Peeling Test

Cut lines were formed at intervals of 1 cm on the polyester film. The polyester film was partially peeled from the plywood along the cut lines. Thereafter, the plywood was fixedly held in the horizontal direction such that the partially peeled polyester film was vertically suspended downward from the plywood. A load of 500 g was applied to an end of the suspended portion of the polyester film. While maintaining that condition, the plywood and the polyester film were then allowed to stand at 60° C. within a dry hot air oven. After one hour, the length of the polyester film further stripped from the plywood by applying the load thereto was measured. The results of the measurement were classified into the following ranks:

◎: The length of the polyester film further stripped after one hour was less than 2 mm;

○: The length of the polyester film further stripped after one hour was less than 5 mm;

Δ: The length of the polyester film further stripped after one hour was not less than 5 mm and less than 20 mm; and X: The length of the polyester film further stripped after one hour was not less than 20 mm.

In accordance with the present invention, the polyester films classified into either of the ranks "◎" and "○" are suitable.

In the afore-mentioned peeling tests, five kinds of adhesives shown in Table 1 below were used. The adhesive property of the polyester film tested was evaluated by an average of five measured values which were respectively obtained by using the five kinds of adhesives.

TABLE 1

| Kind of adhesive | Product used |
|---|---|
| Emulsion-type vinyl acetate-based adhesive | "605" produced by CEMEDEIN CO., LTD. |
| Emulsion-type vinyl acetate-based adhesive | "CH18" produced by KONISHI CO., LTD. |
| Acryl emulsion-based adhesive | "679" produced by CEMEDEIN CO., LTD. |

TABLE 1-continued

| Kind of adhesive | Product used |
| --- | --- |
| Acryl emulsion-based adhesive | "CVC36" produced by KONISHI CO., LTD. |
| Rubber-based adhesive | "G17" produced by KONISHI CO., LTD. |

Production Example 1

100 parts of dimethyl terephthalate, 70 parts of ethylene glycol and 0.07 part of calcium acetate monohydrate were placed in a reaction vessel and heated to distill off methanol and conduct an ester exchange reaction therebetween. After about 4.5 hours from the initiation of the reaction, the temperature of the reaction mixture was reached to 230° C., upon which the ester-exchange reaction was substantially terminated.

Next, 0.04 part of phosphoric acid and 0.035 part of antimony trichloride were added to the reaction mixture. The resultant reaction mixture was then subjected to polymerization according to an ordinary method. Specifically, the temperature of the reaction mixture was gradually elevated up to a final temperature of 280° C., during which the pressure in the reaction vessel was gradually reduced to a final pressure of 0.05 mmHg. After 4 hours, the reaction was terminated and the reaction product was chipped by an ordinary method to obtain a polyester (A). 40 parts of the thus-obtained polyester (A) and 60 parts of rutile titanium dioxide were molten and mixed together in a twin-screw extruder by an ordinary method. Thereafter, the resultant mixture was chipped to obtain master batch polyester chips (B).

88 parts of the polyester chips (A) and 12 parts of the polyester chips (B) were separately dried at 180° C. for 5 hours and then mixed together. The obtained mixture was molten and extruded according to an ordinary method, and rapidly cooled and solidified. The extruded material (sheet) was in turn biaxially stretched 2.9 times in the longitudinal direction at 83° C. and 3.2 times at 125° C. in the transverse direction, respectively, and then heat-treated at 210° C., so that a biaxially stretched polyester film (I) having a thickness of 38 μm was obtained.

Production Example 2

The same procedure as in Example 1 was conducted except that a polyester chips (C) were used instead of the polyester chips (B), wherein upon the production of the polyester chips (B), 3.5 parts of anthraquinone as a yellow pigment, 0.1 part of carbon black and 2.0 parts of iron oxide in addition to 40 parts of the polyester (A) and 60 parts of rutile titanium dioxide, were blended together, the resultant mixture was molten and intimately mixed together in a twin-screw extruder, and then chipped to produce master batch polyester chips (C), thereby obtaining a biaxially stretched polyester film (II).

Production Example 3

The same procedure as in Example 1 was conducted except that the polyester film was produced from the composition composed of 4 parts of the polyester chips (B), 13 parts of polyolefin and 83 parts of the polyester chips (A), thereby obtaining a biaxially stretched polyester film (III).

Comparative Example 1

The same procedure as in Production Example 1 was conducted except that the amount of the polyester chip (B) blended was changed to one part, to produce a biaxially-stretched polyester film (IV). The properties of the thus-obtained polyester film (IV) are shown from Table 5. As seen in Table 5, the polyester film (IV) was unsatisfactory in suitability for decorative plate, i.e., deteriorated in not only adhesive property but also other properties.

Comparative Example 2

The same procedure as in Production Example 1 was conducted except that the film formation was conducted such that the resultant polyester film showed a heat-shrinkage coefficient of 15%, to produce a biaxially-stretched polyester film (V). The properties of the thus-obtained polyester film (V) are shown in Table 5. As seen from Table 5, the polyester film (V) was unsatisfactory in suitability for decorative plate, i.e., deteriorated in not only adhesion property but also other properties.

Example 1

A biaxially-stretched polyester film provided with a coating layer was produced. The combination of the coating layer and a base film used for the production of the polyester film is shown in Table 2. That is, a coating layer 1 was formed on one surface of the polyester film (I) produced in Production Example 1. The composition of the coating layer 1 is shown in Table 3. Specifically, the coating material for the coating layer 1 was prepared by mixing the raw coating materials A and J together in a weight ratio of 95/5 in terms of dry solid content thereof. The mixture of the raw coating materials A and B was diluted with water, if required, and coated on the base film by a bar coater. The thickness of the coating layer 1 after drying was 0.3 μm. The components of the respective coating materials are shown in Table 4. Specifically, the raw coating material A was an aqueous dispersion of polyester, and the raw coating material J was an aqueous dispersion of silicon oxide. Incidentally, it should be noted that while the raw coating materials as shown in Table 4 were composed mainly of the aqueous dispersion, the compositions of the coating layers as shown in Table 3 were based on dry solid contents of the respective raw coating materials, i.e., based on the weights of the raw coating materials from which water content was removed. The properties of the thus-obtained coated polyester film are shown in Table 5. As seen from Table 5, the obtained coated polyester film was satisfactory in suitability for decorative plates including the adhesion property thereof. Incidentally, the adhesion property of the polyester film was evaluated with respect to a surface thereof on which the coating layer is formed.

Example 2

The same procedure as in Example 1 was conducted except that the polyester film (II) obtained in Production Example 2 was used as a base film, to produce a coated polyester film. The properties of the thus-produced coated polyester film are shown in Table 5. As seen from Table 5, the coated polyester film was satisfactory in suitability for decorative plate including the adhesion property thereof.

Example 3

The same procedure as in Example 1 was conducted except that the polyester film (III) obtained in Production Example 3 was used as a base film, to produce a coated polyester film. The properties of the thus-produced coated polyester film are shown in Table 5. As seen from Table 5, the coated polyester film was satisfactory in suitability for decorative plate including the adhesion property thereof.

Comparative Example 3

The same procedure as in Example 1 was conducted except that the polyester film (IV) obtained in Comparative Example 1 was used as a base film, to produce a coated polyester film. The properties of the thus-produced coated polyester film are shown in Table 5. As seen from Table 5, with respect to the suitability for decorative plate, the coated polyester film was satisfactory only in adhesion property thereof but unsatisfactory in other properties thereof.

Comparative Example 4

The same procedure as in Example 1 was conducted except that the polyester film (V) obtained in Comparative Example 2 was used as a base film, to produce a coated polyester film. The properties of the thus-produced coated polyester film are shown in Table 5. As seen from Table 5, with respect to the suitability for decorative plate, the coated polyester film was satisfactory only in adhesion property thereof but unsatisfactory in other properties thereof.

Examples 4 to 7

The same procedure as in Example 2 was conducted except that the compositions of coating layers were varied as shown in Tables 2, 3 and 4, to produce coated polyester films. The properties of the thus-produced coated polyester films are shown in Table 5. All of the coated polyester films were satisfactory in suitability for decorative plate including the adhesion property thereof.

Examples 8

The coating solution was applied onto the polyester film as a base film while the polyester film was biaxially stretched in turn in the longitudinal and transverse directions. Specifically, after the polyester film was stretched 2.9 times its initial dimension in the longitudinal direction at 83° C., the coating solution was applied to one surface of the longitudinally stretched polyester film, which was then stretched 3.2 times its initial dimension in the transverse direction at 125° C.. The procedure of Production Example 1 other than the afore-mentioned stretching and coating process was followed to produce a coated polyester film. That is, the coating solution was prepared by mixing the raw coating materials A and J together and, if necessary, diluting the mixture with water to adjust the weight ratio of A:J to 95:5 in terms of dry solid contents thereof. The thus-prepared coating solution was applied onto the polyester film by a roll coater. The detailed composition of the obtained coating layer are shown in Tables 2, 3 and 4. The properties of the obtained coated polyester film are shown in Table 5. As seen from Table 5, the coated polyester film was satisfactory in suitability for decorative plate including the adhesion property thereof. The coated polyester film obtained in this Example showed a good adhesion property, notwithstanding the film thickness thereof was as small as one third of that of Example 1. In addition, the polyester film of this Example had an extremely excellent sliding property, thereby enabling smooth lamination thereof over the plywood. It was considered that these effects were obtained by using the in-line coating method.

Examples 9 to 22

The coated polyester films were produced by in-line coating method in the same manner as in Example 8 except that the combination of the coating layer and the base film used were varied as shown in Table 2. The detailed composition of the thus-formed coating layers are shown in Tables 2, 3 and 4. The properties of the obtained coated polyester films are shown in Table 5. As seen from Table 5, the coated polyester films were satisfactory in suitability for decorative plate including the adhesion property thereof. All of the coated polyester films obtained in Examples 9 to 22 showed a good adhesion property, not withstanding the film thicknesses thereof were as small as one third of those of Examples 1 to 7. In addition, these coated polyester films had an extremely excellent sliding property, thereby enabling smooth lamination thereof over the plywood. It was considered that these effects were obtained by using the in-line coating method.

Examples 23 to 46

The coated polyester films were produced by in-line coating method in the same manner as in Example 9 except that the combination of the coating layer and the base film used were varied as shown in Table 2. Specifically, all the base films used were composed of the polyester film (II). The coating solution was applied on the base films after longitudinal stretching but before transverse stretching. The detailed composition of the thus-formed coating layers are shown in Tables 2, 3 and 4. The properties of the obtained coated polyester films are shown in Table 5. As seen from Table 5, the coated polyester films were satisfactory in suitability for decorative plate including the adhesion property thereof. Especially in the case where the coating layers contained a cross-linkable component, the resultant coated polyester films were able to frequently exhibit a high adhesion property even at an elevated temperature.

TABLE 2

| Coating layer | Base film | | | | |
|---|---|---|---|---|---|
| | I | II | III | IV | V |
| None | — | — | — | Comparative Example 1 | Comparative Example 2 |
| Coating layer 1 | Example 1 | Example 2 | Example 3 | Comparative Example 3 | Comparative Example 4 |
| Coating layer 2 | — | Example 4 | — | — | — |
| Coating layer 3 | — | Example 5 | — | — | — |
| Coating layer 4 | — | Example 6 | — | — | — |
| Coating layer 5 | — | Example 7 | — | — | — |
| Coating layer 6 | Example 8 | Example 9 | Example 10 | — | — |
| Coating layer 7 | Example 11 | Example 12 | Example 13 | — | — |
| Coating layer 8 | Example 14 | Example 15 | Example 16 | — | — |
| Coating layer 9 | Example 17 | Example 18 | Example 19 | — | — |
| Coating layer 10 | Example 20 | Example 21 | Example 22 | — | — |
| Coating layer 11 | — | Example 23 | — | — | — |
| Coating layer 12 | — | Example 24 | — | — | — |
| Coating | — | Example | — | — | — |

TABLE 2-continued

| Coating layer | Base film | | | | |
|---|---|---|---|---|---|
| | I | II | III | IV | V |
| Coating layer 13 | — | Example 25 | — | — | — |
| Coating layer 14 | — | Example 26 | — | — | — |
| Coating layer 15 | — | Example 27 | — | — | — |
| Coating layer 16 | — | Example 28 | — | — | — |
| Coating layer 17 | — | Example 29 | — | — | — |
| Coating layer 18 | — | Example 30 | — | — | — |
| Coating layer 19 | — | Example 31 | — | — | — |
| Coating layer 20 | — | Example 32 | — | — | — |
| Coating layer 21 | — | Example 33 | — | — | — |
| Coating layer 22 | — | Example 34 | — | — | — |
| Coating layer 23 | — | Example 35 | — | — | — |
| Coating layer 24 | — | Example 36 | — | — | — |
| Coating layer 25 | — | Example 37 | — | — | — |
| Coating layer 26 | — | Example 38 | — | — | — |
| Coating layer 27 | — | Example 39 | — | — | — |
| Coating layer 28 | — | Example 40 | — | — | — |
| Coating layer 29 | — | Example 41 | — | — | — |
| Coating layer 30 | — | Example 42 | — | — | — |
| Coating layer 31 | — | Example 43 | — | — | — |
| Coating layer 32 | — | Example 44 | — | — | — |
| Coating layer 33 | — | Example 45 | — | — | — |
| Coating layer 34 | — | Example 46 | — | — | — |

TABLE 3

[Composition and thickness of coating layer]

| Number of coating layer | Composition of coating layer (dry solid content: wt. %) | layer thickness (μm) |
|---|---|---|
| 1 | A/J = 95/5 | 0.3 |
| 2 | B/J = 95/5 | 0.3 |
| 3 | C/J = 95/5 | 0.3 |
| 4 | D/J = 95/5 | 0.3 |
| 5 | E/B/J = 85/10/5 | 0.3 |
| 6 | A/J = 95/5 | 0.1 |
| 7 | B/J = 95/5 | 0.1 |
| 8 | C/J = 95/5 | 0.1 |
| 9 | D/J = 95/5 | 0.1 |
| 10 | E/B/J = 85/10/5 | 0.1 |
| 11 | H/J = 95/5 | 0.1 |
| 12 | A/F = 90/10 | 0.1 |
| 13 | B/F = 90/10 | 0.1 |
| 14 | C/F = 90/10 | 0.1 |
| 15 | C/A/F/J = 65/20/10/5 | 0.1 |
| 16 | B/A/F/J = 65/20/10/5 | 0.1 |
| 17 | A/B/F/J = 65/20/10/5 | 0.1 |
| 18 | A/E = 90/10 | 0.1 |
| 19 | B/E = 90/10 | 0.1 |
| 20 | C/E = 90/10 | 0.1 |
| 21 | C/A/E/J = 65/20/10/5 | 0.1 |
| 22 | B/A/E/J = 65/20/10/5 | 0.1 |
| 23 | A/B/E/J = 65/20/10/5 | 0.1 |
| 24 | A/H = 90/10 | 0.1 |
| 25 | B/H = 90/10 | 0.1 |
| 26 | C/H = 90/10 | 0.1 |
| 27 | C/A/H/J = 65/20/10/5 | 0.1 |
| 28 | B/A/H/J = 65/20/10/5 | 0.1 |
| 29 | A/B/H/J = 65/20/10/5 | 0.1 |
| 30 | A/I = 80/20 | 0.1 |
| 31 | C/I = 80/20 | 0.1 |
| 32 | A/G = 80/20 | 0.1 |
| 33 | B/G = 80/20 | 0.1 |
| 34 | C/G = 80/20 | 0.1 |

TABLE 4

[Composition of Raw Coating Materiel]

| Raw coating material | Composition |
|---|---|
| A | Aqueous dispersion of polyester resin (aqueous dispersion containing polyester obtained by polymerizing the below-mentioned components at the below-mentioned molar ratio): Terephthalic acid/5-sodium-sulfo-isophthalic acid/ethylene glycol/diethylene glycol = 92/8/77/23 mole % |
| B | Aqueous dispersion of acrylic resin (emulsion polymer obtained by polymerizing the below-mentioned components at the below-mentioned molar ratio): Methyl methacrylate/ethyl acrylate/methylol acrylamide = 47.5/47.5/5 mole % Emulsifier used: dodecyl sulfate-polyoxymethylene (3 moles) and sodium ether (3% based on monomer) |
| C | Aqueous dispersion of polyurethane resin (aqueous dispersion obtained by neutralizing an aqueous polyurethane dispersion produced by reacting 94 parts of polyester having the below-mentioned composition, 6 parts of 2, 2-dimethylol propionic acid and 11 parts of isophorone-di-isocyanate with each other, with triethyl amine): Composition of polyester: Terephthalic acid/isophthalic acid/ethylene glycol/diethylene glycol = 60/40/61/39 mole % |
| D | Aqueous dispersion of oxazoline resin (emulsion polymer obtained by polymerizing the below-mentioned components at the below-mentioned molar ratio): Styrene/butyl acrylate/2-isopropenyl-2-oxazoline/divinyl benzene = 68.1/21.8/10/0.1 mole % Emulsifier used: polyoxyethylene-alkylphenyl ether-sodium sulfate (3% based on monomer) |
| E | Silane coupling agent (3-glycidoxypropyl-trimethoxy silane) |
| F | Hexamethoxymethyl melamine |
| G | Aqueous dispersion of modified bisphenol A-type epoxy resin ("DENAKOL EX-1103" produced by NAGASE KASEI CO., LTD.) |
| H | Aqueous dispersion of blocked isocyanate ("ELASTRON MF-9" produced by DAIIOHI KOGYO SEIYAKU CO., LTD.) |
| I | Aqueous dispersion of acryl-grafted epoxy |

TABLE 4-continued

[Composition of Raw Coating Materiel]

| Raw coating material | Composition |
|---|---|
| | resin (graft polymer obtained by polymerizing monomers (50% as a total amount) having the below-mentioned composition in water) in the presence of a reaction product of 2, 2-bis(4-hydroxyphenyl) propane and epichlorohydrin (50%) Methacrylic acid/ethyl acrylate/styrene = 2/50/48% Incidentally, dimethyl-ethanol amine was used as a neutralizing agent for methacrylic acid to assist the formation of aqueous dispersion. |
| | Trimethoxymethyl melamine was further added to the aqueous dispersion to produce the raw coating material. The amount of trimethoxymethyl melamine added was 5% based on the solid content in the aqueous dispersion. |
| J | Aqueous dispersion of silicon oxide (particle diameter: 0.06 μm) |

TABLE 5

| Properties | Comp. Ex. 1 | Comp. Ex. 2 | Comp. Ex. 3 | Comp. Ex. 4 | Ex. 1 | Ex. 2 | Ex. 3 | Ex. 4 |
|---|---|---|---|---|---|---|---|---|
| Optical density | 0.05 | 1.49 | 0.05 | 1.49 | 1.48 | 1.52 | 0.50 | 1.52 |
| Heat shrinkage percentage | | | | | | | | |
| MD (%) | 3.5 | 15.0 | 2.8 | 12.0 | 2.8 | 2.8 | 2.4 | 2.8 |
| TD (%) | 1.0 | 15.0 | 0.8 | 12.0 | 0.4 | 0.4 | 0.4 | 0.4 |
| Suitability for decorative sheet | | | | | | | | |
| <Change in color tone> | X | ○ | X | ○ | ○ | ○ | ○ | |
| <Surface condition> | ○ | X | ○ | X | ○ | ○ | ○ | ○ |
| <Easiness in embossing> | ○ | ○ | ○ | ○ | ○ | ○ | ⊙ | ○ |
| <Adhesion> | | | | | | | | |
| Manual | X | X | Δ | Δ | Δ | Δ | Δ | Δ |
| Creep | X | X | Δ | Δ | Δ | Δ | Δ | Δ |

| Properties | Ex. 5 | Ex. 6 | Ex. 7 | Ex. 8 | Ex. 9 | Ex. 10 | Ex. 11 | Ex. 12 |
|---|---|---|---|---|---|---|---|---|
| Optical density | 1.52 | 1.52 | 1.52 | 1.48 | 1.52 | 0.50 | 1.48 | 1.52 |
| Heat shrinkage percentage | | | | | | | | |
| MD (%) | 2.8 | 2.8 | 2.8 | 3.5 | 3.5 | 3.0 | 3.5 | 3.5 |
| TD (%) | 0.4 | 0.4 | 0.4 | 0.5 | 0.5 | 0.5 | 0.5 | 0.5 |
| Suitability for decorative sheet | | | | | | | | |
| <Change in color tone> | ○ | ○ | ○ | ○ | ○ | ○ | ○ | ○ |
| <Surface condition> | ○○ | ○ | ○ | ○ | ○ | ○ | ○ | |
| <Easiness in embossing> | ○ | ○ | ○ | ○ | ○ | ⊙ | ○ | ○ |
| <Adhesion> | | | | | | | | |
| Manual | ○ | ○ | Δ | Δ | Δ | Δ | Δ | Δ |
| Creep | ○ | ○ | ○ | ○ | ○ | ○ | ○ | ○ |

TABLE 5-continued

| Properties | Ex. 13 | Ex. 14 | Ex. 15 | Ex. 16 | Ex. 17 | Ex. 18 | Ex. 19 | Ex. 20 |
|---|---|---|---|---|---|---|---|---|
| Optical density | 0.50 | 1.48 | 1.52 | 0.50 | 1.48 | 1.52 | 0.50 | 1.48 |
| Heat shrinkage percentage | | | | | | | | |
| MD (%) | 3.0 | 3.5 | 3.5 | 3.0 | 3.5 | 3.5 | 3.0 | 3.5 |
| TD (%) | 0.5 | 0.5 | 0.5 | 0.5 | 0.5 | 0.5 | 0.5 | 0.5 |
| Suitability for decorative sheet | | | | | | | | |
| <change in color tone> | ○ | ○ | ○ | ○ | ○ | ○ | ○ | |
| <Surface condition> | ○ | ○ | ○ | ○ | ○ | ○ | ○ | ○ |
| <Easiness in embossing> | ◎ | ○ | ○ | ◎ | ○ | ○ | ◎ | ○ |
| <Adhesion> | | | | | | | | |
| Manual | Δ | ○ | ○ | ○ | ○ | ○ | ○ | ○ |
| Creep | ○ | ○ | ○ | ○ | ○ | ○ | ○ | ○ |

| Properties | Ex. 21 | Ex. 22 | Ex. 23 | Ex. 24 | Ex. 25 | Ex. 26 | Ex. 27 | Ex. 28 |
|---|---|---|---|---|---|---|---|---|
| Optical density | 1.52 | 0.50 | 1.52 | 1.52 | 1.52 | 1.52 | 1.52 | 1.52 |
| Heat shrinkage percentage | | | | | | | | |
| ND (%) | 3.5 | 3.0 | 3.5 | 3.5 | 3.5 | 3.5 | 3.5 | 3.5 |
| TD (%) | 0.5 | 0.5 | 0.5 | 0.5 | 0.5 | 0.5 | 0.5 | 0.5 |
| Suitability for decorative sheet | | | | | | | | |
| <Change in color tone> | ○ | ○ | ○ | ○ | ○ | ○ | ○ | ○ |
| <Surface condition> | ○ | ○ | ○ | ○ | ○ | ○ | ○ | ○ |
| <Easiness in embossing> | ○ | ◎ | ○ | ○ | ○ | ○ | ○ | ○ |
| <Adhesion> | | | | | | | | |
| Manual | ○ | ○ | ○ | ○ | ○ | ○ | ○ | ○ |
| Creep | ○ | ○ | ◎ | ◎ | ○ | ◎ | ◎ | ○ |

| Properties | Ex. 29 | Ex. 30 | Ex. 31 | Ex. 32 | Ex. 33 | Ex. 34 | Ex. 35 | Ex. 36 |
|---|---|---|---|---|---|---|---|---|
| Optical density | 1.52 | 1.52 | 1.52 | 1.52 | 1.52 | 1.52 | 1.52 | 1.52 |
| Heat shrinkage percentage | | | | | | | | |
| MD (%) | 3.5 | 3.5 | 3.5 | 3.5 | 3.5 | 3.5 | 3.5 | 3.5 |
| TD (%) | 0.5 | 0.5 | 0.5 | 0.5 | 0.5 | 0.5 | 0.5 | 0.5 |
| Suitability for decorative sheet | | | | | | | | |
| <Change in color tone> | ○ | ○ | ○ | ○ | ○ | ○ | ○ | ○ |
| <Surface> condition> | ○ | ○ | ○ | ○ | ○ | ○ | ○ | ○ |
| <Easiness in embossing> | ○ | ○ | ○ | ○ | ○ | ○ | ○ | ○ |
| <Adhesion> | | | | | | | | |
| Manual | ○ | ○ | ○ | ○ | ○ | ○ | ○ | ○ |
| Creep | ◎ | ○ | ○ | ◎ | ◎ | ○ | ○ | ◎ |

TABLE 5-continued

| Properties | Ex. 37 | Ex. 38 | Ex. 39 | Ex. 40 | Ex. 41 | Ex. 42 | Ex. 43 | Ex. 44 |
|---|---|---|---|---|---|---|---|---|
| Optical density | 1.52 | 1.52 | 1.52 | 1.52 | 1.52 | 1.52 | 1.52 | 1.52 |
| Heat shrinkage percentage | | | | | | | | |
| MD (%) | 3.5 | 3.5 | 3.5 | 3.5 | 3.5 | 3.5 | 3.5 | 3.5 |
| TD (%) | 0.5 | 0.5 | 0.5 | 0.5 | 0.5 | 0.5 | 0.5 | 0.5 |
| Suitability for decorative sheet | | | | | | | | |
| <Change in color tone> | ○ | ○ | ○ | ○ | ○ | ○ | ○ | ○ |
| <Surface> condition> | ○ | ○ | ○ | ○ | ○ | ○ | ○ | ○ |
| <Easiness in embossing> <Adhesion> | ○ | ○ | ○ | ○ | ○ | ○ | ○ | ○ |
| Manual | ○ | ○ | ○ | ○ | ○ | ○ | ○ | ○ |
| Creep | ○ | ⊙ | ⊙ | ○ | ⊙ | ○ | ⊙ | ⊙ |

| Properties | Ex. 45 | Ex. 46 |
|---|---|---|
| Optical density | 1.52 | 1.52 |
| Heat shrinkage percentage | | |
| MD (%) | 3.5 | 3.5 |
| TD (%) | 0.5 | 0.5 |
| Suitability for decorative sheet | | |
| <Change in color tone> | ○ | ○ |
| <Surface> condition> | ○ | ○ |
| <Easiness in embossing> <Adhesion> | ○ | ○ |
| Manual | ○ | ○ |
| Creep | ○ | ⊙ |

Comparative Example 5 and Examples 48 to 139

The measuring methods used in the below-mentioned Examples and Comparative Examples were as follows.
(8) Optical Density: Measured According to the Same Method as Described in "(1) Hiding Power" Hereinbefore
(10) Tensile Modulus A sample film having a length of 300 mm and a width of 20 mm was placed in an atmosphere maintained at a temperature of 23° C. and a relative humidity of 50%, and stretched at a straining rate of 10% per minute by using a tension tester ("INTESCO-MODEL 2001", manufactured by INTESCO CO., LTD.) to obtain a tensile stress-strain characteristic curve. Using an initial linear part of the thus-obtained tensile stress-strain characteristic curve, the tensile modulus of the polyester film was calculated from the following formula:

$$E = \Delta\sigma/\Delta\epsilon$$

wherein E represents a tensile modulus (kg/mm$^2$), $\Delta\sigma$ represents a difference in stress between two points on the linear part based on an original average cross-sectional area, and $\Delta\epsilon$ represents a difference in strain between the two points.
(11) Suitability for V-cut Processing A decorative sheet having the below-mentioned configuration was laminated over a plywood as a flat base material whose surface had a black color tone, to produce a decorative plate. The thus-produced decorative plate was subjected to V-cut processing to form a V-cut groove thereon and bent therealong. Thereafter, the bent decorative plate was observed as to whether or not the plate returned to its original flat shape, to determine the suitability for V-cut processing thereof. The results of the observation were classified into the following ranks:

○: Not returned to the original flat shape, i.e., maintained the bent shape; and X: Returned to the original flat shape Among those involved in the first rank "○", extremely excellent ones were indicated by the symbol "⊙".

In accordance with the present invention, those indicated by the symbols "○" and "⊙" are suitable.

The decorative sheet was prepared in the following manner. First, an optional picture pattern was printed on an inner film. A 50 μm-thick polyester film ("T600-50" produced by DIAFOIL HOECHIST CO., LTD.) or a 50 μm-thick acryl film ("ACRYPRENE HBS" produced by MITSUBISHI RAYON CO., LTD.) as an outer film was laminated over the printed inner film to produce the decorative sheet. The above lamination was conducted by using a saturated polyester resin-based adhesive ("NICHIGO-POLYESTER LP-035" produced by NIPPON GOSEI KAGAKU CO., LTD.). Next, the thus-produced decorative sheet was laminated over the plywood as a flat base material to produce a decorative plate laminated by clear film. The lamination of the decorative sheet over the plywood was performed in such a manner that the inner film of the decorative sheet faced and adhered to the plywood. Five kinds of adhesives shown in Table 1 were used for the lamination. The resultant decorative plate was tested with respect to suitability for V-cut processing while varying the kinds of adhesives used. The suitability for V-cut processing of the decorative plate was finally determined as an average of measured values obtained respectively by using the five adhesives.

(12) Resistance to Impact Deformation

The afore-mentioned decorative plate was placed at a horizontal plane such that the decorative sheet faced upward. An iron ball having a weight of 100 g and a diameter of 3 cm was dropped from 50 cm height onto the decorative plate. The picture pattern on the decorative plate was observed at a position at which the iron ball was dropped, to determine whether or not any dent by falling ball was caused. The results of the observation were classified into the following ranks.

○: No dent by falling ball was recognized.

X: Dent by falling ball was clearly recognized.

Δ: Dent by falling ball was in an intermediate condition between the above two ranks.

(13) Hiding Property

The picture pattern printed on the decorative sheet was observed from a front surface side thereof to determine whether or not any change in color tone thereof occurred. The results of the observation were classified into the following ranks:

○: No change in color tone occurred and its design value was maintained;

X: Considerable change in color tone and deterioration in design value occurred; and Δ: Intermediate condition between the above two ranks.

Among those involved in the first rank "○", extremely excellent ones were indicated by the symbol "⊚".

In accordance with the present invention, those indicated by the symbols "Δ", "○" and "⊚" are suitable.

(14) Adhesion Property

A decorative sheet was prepared in the following manner. First, an optional picture pattern was printed on an inner film. A 50 μm-thick polyester film ("T600-50" produced by DIAFOIL HOECHIST CO., LTD.) or a 50 μm-thick acryl film ("ACRYPRENE HBS" produced by MITSUBISHI RAYON CO., LTD.) as an outer film was laminated over the printed inner film to produce the decorative sheet. Upon laminating, a saturated polyester resin-based adhesive ("NICHIGO-POLYESTER LP-035" produced by NIPPON GOSEI KAGAKU CO., LTD.) was used. Next, the thus-produced decorative sheet was laminated over the plywood as a flat base material to produce a decorative plate laminated by clear film. The lamination of the decorative sheet over the plywood was performed in such a manner as described in "(7) Adhesion property" hereinbefore. Five kinds of adhesives shown in Table 1 were used for the lamination. The resultant decorative plate was tested with respect to adhesion property thereof while varying the kinds of adhesives used. The adhesion property of the decorative plate was finally determined as an average of measured values obtained respectively by using the five adhesives.

The layer (ply) separation of the decorative plate is most likely to occur at a boundary surface between the plywood and the inner film. Accordingly, the adhesion property of the decorative plate was evaluated at this portion by the methods described in "(7-1) Manual peeling test" and "(7-2) High-temperature creep peeling test" of "(7) Adhesion Property" hereinbefore.

Production Example 4

Polyethylene terephthalate containing 13.5% by weight of titanium dioxide and 0.5% by weight of wet silica was dried at 180° C. for 4 hours. The polyethylene terephthalate was extruded at 290° C. by using a melt-extruder. Using an electrostatic pinning method, the extruded polyethylene terephthalate was cooled and solidified by passing over a cooling roll whose surface was maintained at 40° C., to obtain an unstretched film. The thus-obtained unstretched film was stretched 2.5 times in the longitudinal direction at 85° C., thereby obtaining a longitudinally stretched film.

Next, the thus-obtained longitudinally stretched film was introduced into a tentering machine, stretched 3.2 times in the lateral direction by a tentering machine at 120° C. and thereafter heat-set at 210° C., thereby obtaining a biaxially stretched polyester film (VI) having a thickness of 50 μm.

Production Example 5

The same procedure as in Example 4 was conducted except that the amounts of titanium dioxide and wet silica to be added to the polyethylene terephthalate were changed to 7.0% by weight and 0.5% by weight, respectively, to obtain a biaxially stretched polyester film (VII).

Production Example 6

The same procedure as in Example 4 was conducted except that 7.3% by weight of titanium dioxide, 0.01% by weight of carbon black, 0.2% by weight of red oxide, 0.4% by weight of anthraquinone-based yellow pigment and 0.5% by weight of wet silica were added to polyethylene terephthalate, to obtain a biaxially stretched polyester film (VIII).

Production Example 7

Polyethylene terephthalate having 30 mol % of an isophthalic acid component and containing 7.3% by weight of titanium dioxide, 0.01% by weight of carbon black, 0.2% by weight of iron oxide red, 0.4% by weight of anthraquinone-based yellow pigment and 0.5% by weight of wet silica, was dried at 70° C. for one week in a vacuum dryer. Thereafter, the dried polyethylene terephthalate was extruded at 250° C. by using a melt-extruder. Using an electrostatic pinning method, the extruded polyethylene terephthalate was cooled and solidified by passing over a cooling roll whose surface was maintained at 10° C., thereby obtaining an unstretched polyethylene terephthalate film was obtained. The thus-obtained unstretched polyethylene terephthalate film was stretched 2.5 times in the longitudinal direction at 50° C., thereby obtaining a longitudinally stretched film.

Next, the thus-obtained longitudinally stretched film was stretched 3.0 times in the lateral direction by a tentering machine at 90° C. and thereafter, heat-set at 150° C., thereby obtaining a biaxially stretched polyester film (IX) having a thickness of 50 μm.

Production Example 8

The same procedure as in Example 4 was conducted except that polyethylene terephthalate to which 0.6% by weight of titanium dioxide and 0.5% by weight of wet silica were added, was extruded and then the extruded polyethylene terephthalate was cooled and solidified by passing over a cooling roll but not subjected to stretching, thereby obtaining an unstretched polyester film (X) having a thickness of 100 μm.

Production Example 9

The same procedure as in Example 4 was conducted except that polyethylene terephthalate to which 5% by weight of titanium dioxide and 0.5% by weight of wet silica were added, was used, thereby obtaining a biaxially stretched polyester film (XI) having a longitudinal tensile modulus of 500 kg/mm$^2$ and a transverse tensile modulus of 550 kg/mm$^2$.

Comparative Example 5

Using polyethylene terephthalate, the same procedure as in Production Example 4 was conducted to produce a biaxially-stretched polyester film (XII) whose longitudinal and transverse tensile moduli were adjusted to 610 kg/mm$^2$ and 570 kg/mm$^2$, respectively. By using the thus-produced biaxially-stretched polyester film as an inner film and the afore-mentioned polyester film ("T600-50" produced by DIAFOIL HOECHIST CO., LTD.) as an outer film, a decorative plate laminated by clear film was produced in the same manner as described above, and the properties thereof were evaluated. The results are shown in Table 7.

Example 48

A biaxially-stretched polyester film provided with a coating layer was produced. The combination of the coating layer and the base film used is shown in Table 6. Specifically, the coating layer 1 was formed on one surface of the polyester film (VI) produced in Comparative Example 8. The composition of the coating layer 1 is shown in Table 3. The detailed composition of the raw coating materials used are shown in Table 4. By using the thus-produced biaxially-stretched polyester film as an inner film and the afore-mentioned polyester film ("T600-50" produced by DIAFOIL HOECHIST CO., LTD.) as an outer film, a decorative plate laminated by clear film was produced in the same manner as described above, and the properties thereof were evaluated. The properties of the obtained coated polyester film are shown in Table 7. As seen from Table 7, the obtained coated polyester film was satisfactory in suitability for decorative plates including the adhesion property thereof. Incidentally, the adhesion property of the polyester film was evaluated with respect to the surface thereof on which the coating layer is formed.

Examples 49 to 61 and Comparative Example 6

The same procedure as in Example 48 was conducted except that the combination of the coating layer and the base film used was changed as shown in Table 6 and the composition and film thickness of the coating layer were changed as shown in Tables 3 and 4, to produce coated films. The properties of the thus-produced coated films are shown in Table 1. The coated films produced in Examples 49 to 61 all were excellent in suitability for decorative plate including the adhesion property thereof, while the coated film produced in Comparative Example 6 was satisfactory only in adhesion property but unsatisfactory in suitability for V-cut processing.

Example 62

A coated film was produced in the same manner as in Example 48 except that a coating layer was formed on a base film in the course of subjecting the base film to the longitudinal and transverse stretching. Specifically, after the polyester base film was stretched in the longitudinal direction but before it was stretched in the transverse direction, the coating solution was applied onto one surface of the base film to form the coated polyester film. Thereafter, the coated polyester film was stretched in the transverse direction and heat-set to produce a coated biaxially-stretched polyester film. The coating solution was prepared in the same manner as in Example 48, and applied onto the polyester base film by a roll coater. Notwithstanding the thickness of the dried coating layer was as low as one third of that of Example 48 due to the transverse stretching, the coating layer showed a good adhesive property. It was considered that these effects were obtained by using the in-line coating method. The properties of the obtained coated polyester film are shown in Table 7. As seen from Table 7, the coated polyester film are satisfactory in suitability for decorative plate.

Examples 63 to 139

Coated films were produced in the same manner as in Example 62, i.e., by in-line coating method, except that the combination of the coating layer and the base film used was changed as shown in Table 6. In any case, after the polyester base film was stretched in the longitudinal direction but before it was stretched in the transverse direction, the coating solution was applied onto one surface of the base film to form the coated polyester film. Thereafter, the coated polyester film was stretched in the transverse direction and heat-set to produce a coated biaxially-stretched polyester film. The application of the coating solution onto the base film was conducted in the same manner as in Example 62. The compositions and film thicknesses of the obtained coating layers are shown in Table 3. Production conditions other than the application of the coating solution were the same as those used for the production of the respective base films. The properties of the obtained coated films are shown in Table 7. Although all the coating layers had thicknesses as small as one third of those of Examples 48 to 61, the coated films were satisfactory in suitability for decorative plate including the adhesion property thereof. Especially in the case where the coating layers contained a cross-linking agent, the resultant coated polyester films were above to frequently exhibit a high adhesion property even at an elevated temperature.

TABLE 6

| Coating layer | Base film | | | | | | |
|---|---|---|---|---|---|---|---|
| | VI | VII | VIII | IX | X | XI | XII |
| None | — | — | — | — | — | — | Comp. Ex. 5 |
| Coating | Ex. 48 | Ex. 49 | Ex. 50 | Ex. 51 | Ex. 52 | Ex. 53 | Comp. |

TABLE 6-continued

| Coating layer | Base film | | | | | | |
|---|---|---|---|---|---|---|---|
| | VI | VII | VIII | IX | X | XI | XII |
| layer 1 | | | | | | | Ex. 6 |
| Coating layer 2 | — | — | Ex. 54 | Ex. 55 | — | — | — |
| Coating layer 3 | — | — | Ex. 56 | Ex. 57 | — | — | — |
| Coating layer 4 | — | — | Ex. 58 | Ex. 59 | — | — | — |
| Coating layer 5 | — | — | Ex. 60 | Ex. 61 | — | — | — |
| Coating layer 6 | Ex. 62 | Ex. 63 | Ex. 64 | Ex. 65 | Ex. 66 | Ex. 67 | — |
| Coating layer 7 | Ex. 68 | Ex. 69 | Ex. 70 | Ex. 71 | Ex. 72 | Ex. 73 | — |
| Coating layer 8 | Ex. 74 | Ex. 75 | Ex. 76 | Ex. 77 | Ex. 78 | Ex. 79 | — |
| Coating layer 9 | Ex. 80 | Ex. 81 | Ex. 82 | Ex. 83 | Ex. 84 | Ex. 85 | — |
| Coating layer 10 | Ex. 86 | Ex. 87 | Ex. 88 | Ex. 89 | Ex. 90 | Ex. 91 | — |
| Coating layer 11 | — | — | Ex. 92 | Ex. 93 | — | — | — |
| Coating layer 12 | — | — | Ex. 94 | Ex. 95 | — | — | — |
| Coating layer 13 | — | — | Ex. 96 | Ex. 97 | — | — | — |
| Coating layer 14 | — | — | Ex. 98 | Ex. 99 | — | — | — |
| Coating layer 15 | — | — | Ex. 100 | Ex. 101 | — | — | — |
| Coating layer 16 | — | — | Ex. 102 | Ex. 103 | — | — | — |
| Coating layer 17 | — | — | Ex. 104 | Ex. 105 | — | — | — |
| Coating layer 18 | — | — | Ex. 106 | Ex. 107 | — | — | — |
| Coating layer 19 | — | — | Ex. 108 | Ex. 109 | — | — | — |
| Coating layer 20 | — | — | Ex. 110 | Ex. 111 | — | — | — |
| Coating layer 21 | — | — | Ex. 112 | Ex. 113 | — | — | — |
| Coating layer 22 | — | — | Ex. 114 | Ex. 115 | — | — | — |
| Coating layer 23 | — | — | Ex. 116 | Ex. 117 | — | — | — |
| Coating layer 24 | — | — | Ex. 118 | Ex. 119 | — | — | — |
| Coating layer 25 | — | — | Ex. 120 | Ex. 121 | — | — | — |
| Coating layer 26 | — | — | Ex. 122 | Ex. 123 | — | — | — |
| Coating layer 27 | — | — | Ex. 124 | Ex. 125 | — | — | — |
| Coating layer 28 | — | — | Ex. 126 | Ex. 127 | — | — | — |
| Coating layer 29 | — | — | Ex. 128 | Ex. 129 | — | — | — |
| Coating layer 30 | — | — | Ex. 130 | Ex. 131 | — | — | — |
| Coating layer 31 | — | — | Ex. 132 | Ex. 133 | — | — | — |
| Coating layer 32 | — | — | Ex. 134 | Ex. 135 | — | — | — |
| Coating layer 33 | — | — | Ex. 136 | Ex. 137 | — | — | — |
| Coating layer 34 | — | — | Ex. 138 | Ex. 139 | — | — | — |

TABLE 7

| Properties | Comp. Ex. 5 | Comp. Ex. 6 | Ex. 48 | Ex. 49 | Ex. 50 | Ex. 51 | Ex. 52 | Ex. 53 |
|---|---|---|---|---|---|---|---|---|
| Optical density | 0.1 | 0.1 | 0.8 | 0.5 | 1.7 | 1.7 | 0.1 | 0.4 |
| Tensile modulus | | | | | | | | |
| MD (kg/mm$^2$) | 610 | 610 | 440 | 440 | 440 | 300 | 190 | 500 |
| TD (kg/mm$^2$) | 560 | 560 | 480 | 480 | 480 | 300 | 190 | 550 |
| Suitability for decorative sheet | | | | | | | | |
| <Suitability for V-cut processing> | X | X | ◯ | ◯ | ◯ | ◉ | ◉ | ◯ |
| <resistance to impact deformation> | ◯ | ◯ | ◯ | ◯ | ◯ | ◯ | ◯ | ◯ |
| <Hinding Power> | Δ | Δ | ◉ | ◉ | ◉ | ◉ | Δ | ◯ |
| <Adhesion> | | | | | | | | |
| Manual | X | Δ | Δ | Δ | Δ | Δ | Δ | Δ |
| Creep | X | Δ | Δ | Δ | Δ | Δ | Δ | Δ |

| Properties | Ex. 54 | Ex. 55 | Ex. 56 | Ex. 57 | Ex. 58 | Ex. 59 | Ex. 60 | Ex. 61 |
|---|---|---|---|---|---|---|---|---|
| Optical density | 1.7 | 1.7 | 1.7 | 1.7 | 1.7 | 1.7 | 1.7 | 1.7 |
| Tensile modulus | | | | | | | | |
| MD (kg/mm$^2$) | 440 | 300 | 440 | 300 | 440 | 300 | 440 | 300 |
| TD (kg/mm$^2$) | 480 | 300 | 480 | 300 | 480 | 300 | 480 | 300 |
| Suitability for decorative sheet | | | | | | | | |
| <Suitability for V-cut processing> | ◯ | ◉ | ◯ | ◉ | ◯ | ◉ | ◯ | ◉ |
| <resistance to impact deformation> | ◯ | ◯ | ◯ | ◯ | ◯ | ◯ | ◯ | ◯ |
| <Hinding Power> | ◉ | ◉ | ◉ | ◉ | ◉ | ◉ | ◉ | ◉ |
| <Adhesion> | | | | | | | | |
| Manual | Δ | Δ | ◯ | ◯ | ◯ | ◯ | Δ | Δ |
| Creep | Δ | Δ | ◯ | ◯ | ◯ | ◯ | ◯ | ◯ |

| Properties | Ex. 62 | Ex. 63 | Ex. 64 | Ex. 65 | Ex. 66 | Ex. 67 | Ex. 68 | Ex. 69 |
|---|---|---|---|---|---|---|---|---|
| Optical density | 0.8 | 0.5 | 1.7 | 1.7 | 0.1 | 0.4 | 0.8 | 0.5 |
| Tensile modulus | | | | | | | | |
| MD (kg/mm$^2$) | 440 | 440 | 440 | 300 | 190 | 500 | 440 | 440 |
| TD (kg/mm$^2$) | 480 | 480 | 480 | 300 | 190 | 550 | 480 | 480 |
| Suitability for decorative sheet | | | | | | | | |
| <Suitability for V-cut processing> | ◯ | ◯ | ◯ | ◉ | ◉ | ◯ | ◯ | ◯ |
| <resistance to impact deformation> | ◯ | ◯ | ◯ | ◯ | ◯ | ◯ | ◯ | ◯ |
| <Hinding Power> | ◉ | ◉ | ◉ | ◉ | Δ | ◯ | ◉ | ◉ |
| <Adhesion> | | | | | | | | |
| Manual | Δ | Δ | Δ | Δ | Δ | Δ | Δ | Δ |
| Creep | ◯ | ◯ | ◯ | ◯ | ◯ | ◯ | ◯ | ◯ |

TABLE 7-continued

| Properties | Ex. 70 | Ex. 71 | Ex. 72 | Ex. 73 | Ex. 74 | Ex. 75 | Ex. 76 | Ex. 77 |
|---|---|---|---|---|---|---|---|---|
| Optical density | 1.7 | 1.7 | 0.1 | 0.4 | 0.8 | 0.5 | 1.7 | 1.7 |
| Tensile modulus | | | | | | | | |
| MD (kg/mm$^2$) | 440 | 300 | 190 | 500 | 440 | 440 | 440 | 300 |
| TD (kg/mm$^2$) | 480 | 300 | 190 | 550 | 480 | 480 | 480 | 300 |
| Suitability for decorative sheet | | | | | | | | |
| <Suitability for V-cut processing> | ○ | ◎ | ◎ | ○ | ○ | ○ | ○ | ◎ |
| <resistance to impact deformation> | ○ | ○ | ○ | ○ | ○ | ○ | ○ | ○ |
| <Hinding Power> | ◎ | ◎ | Δ | ○ | ◎ | ◎ | ◎ | ◎ |
| <Adhesion> | | | | | | | | |
| Manual | Δ | Δ | Δ | Δ | ○ | ○ | ○ | ○ |
| Creep | ○ | ○ | ○ | ○ | ○ | ○ | ○ | ○ |

| Properties | Ex. 78 | Ex. 79 | Ex. 80 | Ex. 81 | Ex. 82 | Ex. 83 | Ex. 84 | Ex. 85 |
|---|---|---|---|---|---|---|---|---|
| Optical density | 0.1 | 0.4 | 0.8 | 0.5 | 1.7 | 1.7 | 0.1 | 0.4 |
| Tensile modulus | | | | | | | | |
| MD (kg/mm$^2$) | 190 | 500 | 440 | 440 | 440 | 300 | 190 | 500 |
| TD (kg/mm$^2$) | 190 | 550 | 480 | 480 | 480 | 300 | 190 | 550 |
| Suitability for decorative sheet | | | | | | | | |
| <Suitability for V-cut processing> | ◎ | ○ | ○ | ○ | ○ | ◎ | ◎ | ○ |
| <resistance to impact deformation> | ○ | ○ | ○ | ○ | ○ | ○ | ○ | ○ |
| <Hinding Power> | Δ | ○ | ◎ | ◎ | ◎ | ◎ | Δ | ○ |
| <Adhesion> | | | | | | | | |
| Manual | ○ | ○ | ○ | ○ | ○ | ○ | ○ | ○ |
| Creep | ○ | ○ | ○ | ○ | ○ | ○ | ○ | ○ |

| Properties | Ex. 86 | Ex. 87 | Ex. 88 | Ex. 89 | Ex. 90 | Ex. 91 | Ex. 92 | Ex. 93 |
|---|---|---|---|---|---|---|---|---|
| Optical density | 0.8 | 0.5 | 1.7 | 1.7 | 0.1 | 0.4 | 1.7 | 1.7 |
| Tensile modulus | | | | | | | | |
| MD (kg/mm$^2$) | 440 | 440 | 440 | 300 | 190 | 500 | 440 | 300 |
| TD (kg/mm$^2$) | 480 | 480 | 480 | 300 | 190 | 550 | 480 | 300 |
| Suitability for decorative sheet | | | | | | | | |
| <Suitability for V-cut processing> | ○ | ○ | ○ | ◎ | ◎ | ○ | ○ | ◎ |
| <resistance to impact deformation> | ○ | ○ | ○ | ○ | ○ | ○ | ○ | ○ |
| <Hinding Power> | ◎ | ◎ | ◎ | ◎ | Δ | ○ | ◎ | ◎ |
| <Adhesion> | | | | | | | | |
| Manual | ○ | ○ | ○ | ○ | ○ | ○ | ○ | ○ |
| Creep | ○ | ○ | ○ | ○ | ○ | ○ | ○ | ○ |

| Properties | Ex. 94 | Ex. 95 | Ex. 96 | Ex. 97 | Ex. 98 | Ex. 99 | Ex. 100 | Ex. 101 |
|---|---|---|---|---|---|---|---|---|
| Optical density | 1.7 | 1.7 | 1.7 | 1.7 | 1.7 | 1.7 | 1.7 | 1.7 |

TABLE 7-continued

| Tensile modulus | | | | | | | | |
|---|---|---|---|---|---|---|---|---|
| MD (kg/mm$^2$) | 440 | 300 | 440 | 300 | 440 | 300 | 440 | 300 |
| TD (kg/mm$^2$) | 480 | 300 | 480 | 300 | 480 | 300 | 480 | 300 |
| Suitability for decorative sheet | | | | | | | | |
| <Suitability for V-cut processing> | ◯ | ⊙ | ◯ | ⊙ | ◯ | ⊙ | ◯ | ⊙ |
| <resistance to impact deformation> | ◯ | ◯ | ◯ | ◯ | ◯ | ◯ | ◯ | ◯ |
| <Hinding Power> | ⊙ | ⊙ | ⊙ | ⊙ | ⊙ | ⊙ | ⊙ | ⊙ |
| <Adhesion> | | | | | | | | |
| Manual | ◯ | ◯ | ◯ | ◯ | ◯ | ◯ | ◯ | ◯ |
| Creep | ⊙ | ⊙ | ◯ | ◯ | ⊙ | ⊙ | ⊙ | ⊙ |

| Properties | Ex. 102 | Ex. 103 | Ex. 104 | Ex. 105 | Ex. 106 | Ex. 107 | Ex. 108 | Ex. 109 |
|---|---|---|---|---|---|---|---|---|
| Optical density | 0.1 | 0.1 | 0.8 | 0.5 | 1.7 | 1.7 | 0.1 | 0.4 |
| Tensile modulus | | | | | | | | |
| MD (kg/mm$^2$) | 440 | 300 | 440 | 300 | 440 | 300 | 440 | 300 |
| TD (kg/mm$^2$) | 480 | 300 | 480 | 300 | 480 | 300 | 480 | 300 |
| Suitability for decorative sheet | | | | | | | | |
| <Suitability for V-cut processing> | ◯ | ⊙ | ◯ | ⊙ | ◯ | ⊙ | ◯ | ⊙ |
| <resistance to impact deformation> | ◯ | ◯ | ◯ | ◯ | ◯ | ◯ | ◯ | ◯ |
| <Hinding Power> | ⊙ | ⊙ | ⊙ | ⊙ | ⊙ | ⊙ | ⊙ | ⊙ |
| <Adhesion> | | | | | | | | |
| Manual | ◯ | ◯ | ◯ | ◯ | ◯ | ◯ | ◯ | ◯ |
| Creep | ◯ | ◯ | ⊙ | ⊙ | ◯ | ◯ | ◯ | ◯ |

| Properties | Ex. 110 | Ex. 111 | Ex. 112 | Ex. 113 | Ex. 114 | Ex. 115 | Ex. 116 | Ex. 117 |
|---|---|---|---|---|---|---|---|---|
| Tensile modulus | | | | | | | | |
| MD (kg/mm$^2$) | 440 | 300 | 440 | 300 | 440 | 300 | 440 | 300 |
| TD (kg/mm$^2$) | 480 | 300 | 480 | 300 | 480 | 300 | 480 | 300 |
| Suitability for decorative sheet | | | | | | | | |
| <Suitability for V-cut processing> | ◯ | ⊙ | ◯ | ⊙ | ◯ | ⊙ | ◯ | ⊙ |
| <resistance to impact deformation> | ◯ | ◯ | ◯ | ◯ | ◯ | ◯ | ◯ | ◯ |
| <Hinding Power> | ⊙ | ⊙ | ⊙ | ⊙ | ⊙ | ⊙ | ⊙ | ⊙ |
| <Adhesion> | | | | | | | | |
| Manual | ◯ | ◯ | ◯ | ◯ | ◯ | ◯ | ◯ | ◯ |
| Creep | ⊙ | ⊙ | ⊙ | ⊙ | ⊙ | ⊙ | ⊙ | ⊙ |

| Properties | Ex. 118 | Ex. 119 | Ex. 120 | Ex. 121 | Ex. 122 | Ex. 123 | Ex. 124 | Ex. 125 |
|---|---|---|---|---|---|---|---|---|
| Optical density | 1.7 | 1.7 | 1.7 | 1.7 | 1.7 | 1.7 | 1.7 | 1.7 |
| Tensile modulus | | | | | | | | |
| MD (kg/mm$^2$) | 440 | 300 | 440 | 300 | 440 | 300 | 440 | 300 |
| TD (kg/mm$^2$) | 480 | 300 | 480 | 300 | 480 | 300 | 480 | 300 |

TABLE 7-continued

| Properties | | | | | | | | |
|---|---|---|---|---|---|---|---|---|
| Suitability for decorative sheet | | | | | | | | |
| <Suitability for V-cut processing> | ○ | ⊙ | ○ | ⊙ | ○ | ⊙ | ○ | ⊙ |
| <resistance to impact deformation> | ○ | ○ | ○ | ○ | ○ | ○ | ○ | ○ |
| <Hinding Power> | ⊙ | ⊙ | ⊙ | ⊙ | ⊙ | ⊙ | ⊙ | ⊙ |
| <Adhesion> | | | | | | | | |
| Manual Creep | ○ ⊙ | ○ ⊙ | ○ ⊙ | ○ ○ | ○ ⊙ | ○ ⊙ | ○ ⊙ | ○ ⊙ |

| Properties | Ex. 70 | Ex. 71 | Ex. 72 | Ex. 73 | Ex. 74 | Ex. 75 | Ex. 76 | Ex. 77 |
|---|---|---|---|---|---|---|---|---|
| Optical density | 1.7 | 1.7 | 1.7 | 1.7 | 1.7 | 1.7 | 1.7 | 1.7 |
| Tensile modulus | | | | | | | | |
| MD (kg/mm$^2$) | 440 | 300 | 440 | 300 | 440 | 300 | 440 | 300 |
| TD (kg/mm$^2$) | 480 | 300 | 480 | 300 | 480 | 300 | 480 | 300 |
| Suitability for decorative sheet | | | | | | | | |
| <Suitability for V-cut processing> | ○ | ⊙ | ○ | ⊙ | ○ | ⊙ | ○ | ⊙ |
| <resistance to impact deformation> | ○ | ○ | ○ | ○ | ○ | ○ | ○ | ○ |
| <Hinding Power> | ⊙ | ⊙ | ⊙ | ⊙ | ⊙ | ⊙ | ⊙ | ⊙ |
| <Adhesion> | | | | | | | | |
| Manual Creep | ○ ○ | ○ ○ | ○ ⊙ | ○ ⊙ | ○ ○ | ○ ○ | ○ ⊙ | ○ ⊙ |

| Properties | Ex. 134 | Ex. 135 | Ex. 136 | Ex. 137 | Ex. 138 | Ex. 139 | Ex. | Ex. |
|---|---|---|---|---|---|---|---|---|
| Optical density | 1.7 | 1.7 | 1.7 | 1.7 | 1.7 | 1.7 | | |
| Tensile modulus | | | | | | | | |
| MD (kg/mm$^2$) | 440 | 300 | 440 | 300 | 440 | 300 | | |
| TD (kg/mm$^2$) | 480 | 300 | 480 | 300 | 480 | 300 | | |
| Suitability for decorative sheet | | | | | | | | |
| <Suitability for V-cut processing> | ○ | ⊙ | ○ | ⊙ | ○ | ⊙ | | |
| <resistance to impact deformation> | ○ | ○ | ○ | ○ | ○ | ○ | | |
| <Hinding Power> | ⊙ | ⊙ | ⊙ | ⊙ | ⊙ | ⊙ | | |
| <Adhesion> | | | | | | | | |
| Manual Creep | ○ ⊙ | ○ ⊙ | ○ ○ | ○ ○ | ○ ⊙ | ○ ⊙ | | |

What is claimed is:

1. A polyester film for decorative plate or decorative sheet, which comprises a base polyester film and a coating layer formed on at least one surface of said base polyester film, wherein said polyester film for decorative plate or decorative sheet has an optical density of 0.1 to 5.0 and longitudinal and transverse heat shrinkage percentages of not less than −10.0% and not more than +10.0% after said polyester film for decorative plate or decorative sheet is heat-treated at 180° C. for 5 minutes.

2. A polyester film according to claim 1, wherein said coating layer comprises at least one compound selected from the group consisting of a polyester resin, an acrylic resin, a polyurethane resin, an amino resin, an epoxy resin, an oxazoline resin and a coupling agent.

3. A polyester film according to claim 1, wherein said coating layer is formed by in-line coating method.

4. A decorative plate comprising a substrate and at least a polyester film layer comprising the polyester film according to claim 1 and a printed layer, wherein said printed layer is laminated on said base polyester film and wherein said coating layer is laminated on said substrate.

5. A decorative sheet comprising a polyester film layer comprising the polyester film according to claim 1 and a printed layer formed on said base polyester film of said film layer.

6. A polyester film for decorative laminated plate, which comprises a base polyester film and a coating layer formed on at least one surface of said base film, wherein said polyester film for decorative laminated plate has longitudinal and transverse tensile moduli of not more than 600 kg/mm$^2$.

7. A polyester film according to claim 6, wherein said polyester film has longitudinal and transverse tensile moduli of not less than 190 kg/mm$^2$.

8. A polyester film according to claim 6, wherein said coating layer comprises at least one compound selected from the group consisting of a polyester resin, an acrylic resin, a polyurethane resin, an amino resin, an epoxy resin, an oxazoline resin and a coupling agent.

9. A polyester film according to claim 6, wherein said coating layer is formed by in-line coating method.

10. A decorative laminated plate, which comprises a substrate, at least a first adhesive layer, an inner film layer comprising the polyester film for decorative laminated plate according to claim 6, a printed layer, a second adhesive layer and an outer film layer, wherein said outer film layer is laminated over said second adhesive layer, said second adhesive layer is laminated over said printed layer, said printed layer is laminated over said polyester film for decorative laminated plate, said polyester film for decorative laminated plate is laminated over said first adhesive layer, and said first adhesive layer is laminated over said substrate.

* * * * *